US012368836B2

(12) United States Patent
Sato

(10) Patent No.: US 12,368,836 B2
(45) Date of Patent: Jul. 22, 2025

(54) IMAGE DISPLAY SYSTEM AND IMAGE DISPLAY METHOD

(71) Applicant: VIRTUALWINDOW CO., LTD., Tokyo (JP)

(72) Inventor: Rui Sato, Tokyo (JP)

(73) Assignee: VIRTUALWINDOW CO., LTD., Tokyo (JP)

( * ) Notice: Subject to any disclaimer, the term of this patent is extended or adjusted under 35 U.S.C. 154(b) by 39 days.

(21) Appl. No.: 18/569,465

(22) PCT Filed: Jun. 28, 2022

(86) PCT No.: PCT/JP2022/025782
§ 371 (c)(1),
(2) Date: Dec. 12, 2023

(87) PCT Pub. No.: WO2023/277020
PCT Pub. Date: Jan. 5, 2023

(65) Prior Publication Data
US 2024/0275935 A1 Aug. 15, 2024

(30) Foreign Application Priority Data
Jul. 1, 2021 (JP) ................. 2021-110343

(51) Int. Cl.
H04N 13/282 (2018.01)
G06F 3/01 (2006.01)
(52) U.S. Cl.
CPC ........... H04N 13/282 (2018.05); G06F 3/017 (2013.01)
(58) Field of Classification Search
None
See application file for complete search history.

(56) References Cited

U.S. PATENT DOCUMENTS

2015/0279103 A1* 10/2015 Naegle ............... H04B 1/717
345/633
2019/0281280 A1 9/2019 Baldwin et al.
(Continued)

FOREIGN PATENT DOCUMENTS

WO 2009/095862 A1 8/2009
WO 2019/171557 A1 9/2019
WO 2020/189319 A1 9/2020

OTHER PUBLICATIONS

Sep. 6, 2022 International Search Report issued in International Patent Application No. PCT/JP2022/025782.
(Continued)

Primary Examiner — Talha M Nawaz
(74) Attorney, Agent, or Firm — Oliff PLC

(57) ABSTRACT

A display has a screen that can simultaneously display different images in a plurality of display directions. An image generation unit generates, for each of one or more user viewpoint positions within a user space, which is forward from the screen of the display and in which one or more users viewing an image displayed on the screen can be present, a display image of a three-dimensional object, in which the three-dimensional object appears in the same manner as when the three-dimensional object in a virtual space is being viewed via the screen from the user viewpoint position. An image display unit causes the screen of the display to display, for each of the user viewpoint positions, the display image generated so as to correspond to the user viewpoint position, the display images being displayed in user viewpoint position directions that correspond to the user viewpoint positions.

17 Claims, 12 Drawing Sheets

(56) References Cited

U.S. PATENT DOCUMENTS

2020/0413021 A1 12/2020 Sato
2022/0217324 A1 7/2022 Kobayashi et al.
2024/0361835 A1* 10/2024 Hylak .................... G06F 3/013
2024/0411421 A1* 12/2024 Pastrana Vicente .... G06F 3/011

OTHER PUBLICATIONS

Kazuki Yokoyama et al. "Eye-Sensing Light Field Display, Delivering 3D Creators' Visions to Customers the Way They Intended". Sep. 30, 2020, Sony Corporation R&D Center, Sony Corporation homepage, <URL: https://www.sony.com/ja/SonyInfo/technology/stories/LFD>.
Mar. 14, 2025 Extended Search Report issued in European Patent Application No. 22830371.5.
May 8, 2023 International Preliminary Report on Patentability issued in International Patent Application No. PCT/JP2022/025782.

* cited by examiner

IMAGE DISPLAY SYSTEM AND IMAGE DISPLAY METHOD

TECHNICAL FIELD

The present invention relates to an image display system and an image display method for displaying, on a display, an image in which a three-dimensional object in a virtual three-dimensional space appears in the same manner as when the three-dimensional object is being viewed from the position of a user.

BACKGROUND ART

A technique called an Eye-sensing Light Field Display (ELFD) has been known as a technique for stereoscopically displaying, on a display, an image that is visible when a three-dimensional object in a virtual three-dimensional space is viewed from the position of a user (e.g., NPL 1). In this technique, the positions of left and right eyes are calculated in horizontal, vertical, and depth directions in real time through line-of-sight recognition using facial recognition technology. Next, based on location information of the user, an image actually being viewed by the user with both eyes is acquired, assuming that a subject has been placed within a display device, and this image is converted into an image on a display surface, a light source image that is emitted from a display panel is generated in combination with micro-optical lens technology, and a viewpoint image is presented to both eyes. This enables the user to feel as if the subject is actually there.

CITATION LIST

Non Patent Literature

[NPL 1]
Kazuki Yokoyama and 4 others, "Eye-Sensing Light Field Display, Delivering 3D Creators' Visions to Customers the Way They Intended", [online], Sep. 30, 2020, Sony Corporation R&D Center, Sony Corporation homepage, [searched on Jun. 26, 2021], Internet <URL: https://www.sony.com/ja/SonyInfo/technology/stories/LFD/>

SUMMARY OF INVENTION

Technical Problem

When considering implementing such technology as a simulated window display in a hotel or the like, for example, it is envisioned that the display will not be viewed by only one user, but by a plurality of people from different locations. However, in the above-described conventional technique, eye sensing can only be performed for one person, and display can only be performed for one user at a time.

An object of the present invention is to realize an effect of imparting, to a plurality of people, an optical illusion as though a virtual three-dimensional world or a three-dimensional object that is not actually present were present in a three-dimensional space expanding behind or in front of a display without imparting any sense of discomfort when all of the plurality of people are simultaneously viewing the display with the naked eye.

Solution to Problem

An image display system according serving as an example of an aspect of the present invention includes: a display including a screen capable of simultaneously displaying different images in a plurality of display directions; a storage unit configured to store screen arrangement data indicating a position, orientation, and shape of the screen in a predetermined reference coordinate space set virtually, three-dimensional data representing a three-dimensional object in the reference coordinate space, and user viewpoint position data indicating one or more user viewpoint positions in the reference coordinate space; an image generation unit configured to generate, for each of the one or more user viewpoint positions, a display image of the three-dimensional object in which the three-dimensional object appears in the same manner as when the three-dimensional object in the reference coordinate space is being viewed via the screen from the user viewpoint position, the display image being generated based on the screen arrangement data and the three-dimensional data; and an image display unit configured to cause the display to display, for each of the one or more user viewpoint positions, the display image generated so as to correspond to the user viewpoint position, the display images being displayed in user viewpoint position directions that correspond to the user viewpoint positions.

Advantageous Effects of Invention

According to the present invention, it is possible to realize an effect as though a virtual three-dimensional object that is not actually present were present in a three-dimensional space expanding behind or directly in front of a display, without imparting any sense of discomfort when all of a plurality of people are simultaneously viewing the display with the naked eye.

DESCRIPTION OF EMBODIMENTS

Hereinafter, embodiments for carrying out the present invention will be described in detail with reference to the drawings.

Figure 1:
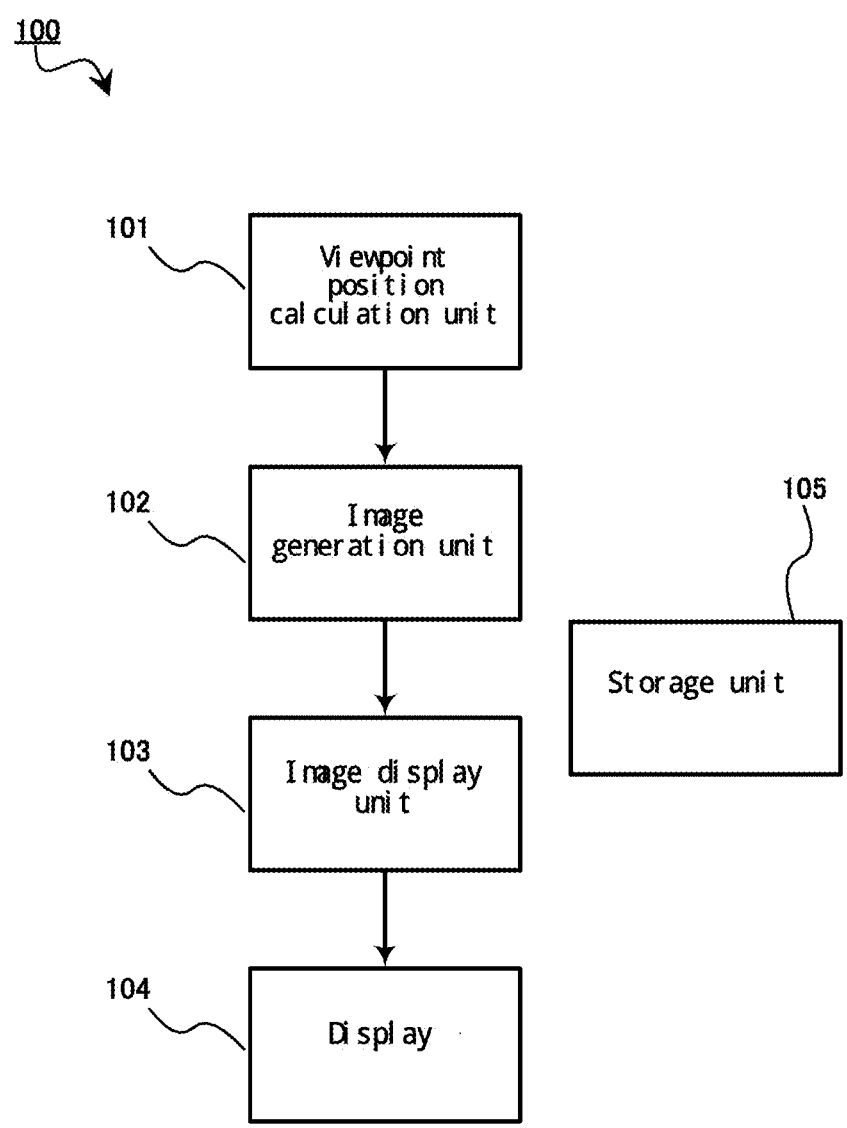
FIG. 1 is a block diagram of an image display system according to an embodiment.
Figure 2:
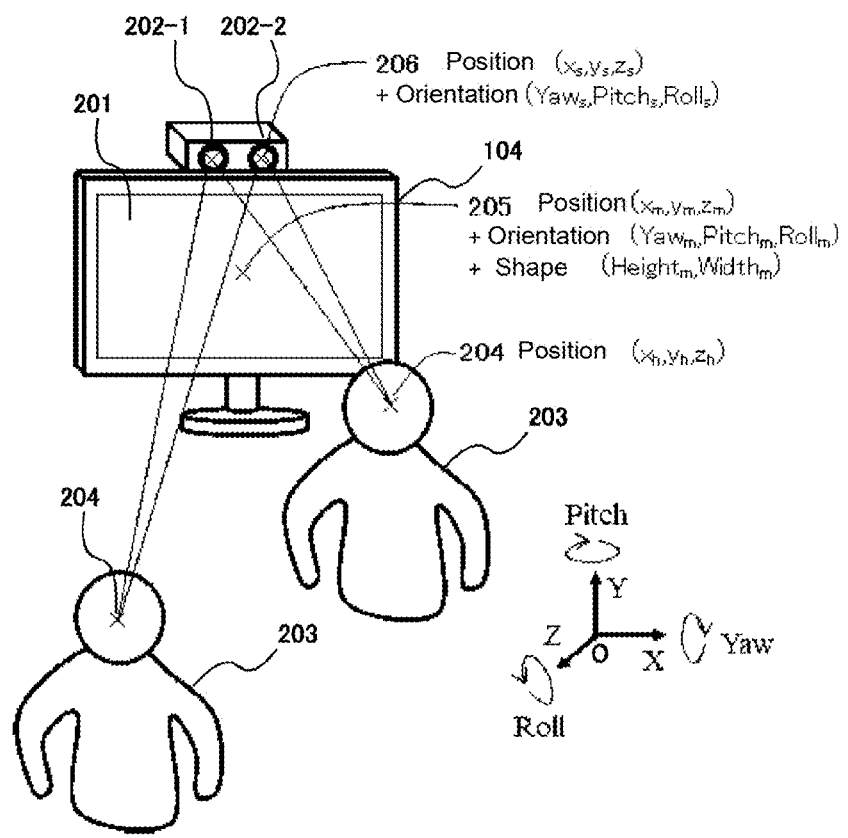
FIG. 2 is a diagram showing an example of an external appearance according to an embodiment.

FIG. 1 is a block diagram of an image display system 100 according to an embodiment. FIG. 2 is a diagram showing an example of an external appearance according to an embodiment.

In FIG. 1, the image display system 100 includes a display 104, a viewpoint position calculation unit 101, an image generation unit 102, and an image display unit 103. Also, in FIG. 2, a user space image capture unit 202 is provided.

The display 104 is, for example, a light field display of a type in which a lenticular lens is attached to the surface of a liquid crystal display, which has a screen 201 (FIG. 2) that can simultaneously display different images in a plurality of display directions. Here, although there is no particular limitation on the display method of the display, the display may be a liquid crystal display, a plasma display, an organic EL display, a field emission display (FED), a mini LED display, a micro LED display, or a large LED array. The display may also be a sheet on which images are projected from behind using a rear projection method. In addition to lenticular lenses, the lenses attached to the surface may be spherical lenses that control the direction of light, or a large lens or sheet that matches the size of the large LED array. Instead of a lens element, a parallax barrier or the like having a plurality of slits arranged therein may also be used. Also, the method for displaying images in a plurality of display directions is not limited to the lens array method, and may be one in which a plurality of displays are stacked. A tensor display may also be used.

The viewpoint position calculation unit 101 simultaneously detects each user viewpoint position 204 in a predetermined reference coordinate space (FIG. 2) of one or more users 203 present in a user space, which is forward from a screen 201 of the display 104 and in which the users viewing an image displayed on the screen 201 can be present.

Here, user space image capture units 202-1 and 202-2 (these are the same, and both or either are referred to simply as "user space image capture units 202" in some cases) are installed, for example, above the display 104. The user space image capture unit 202 images the user space that is forward from the screen 201 of the display 104 and in which the users 203 viewing the image displayed on the screen 201 can be present, and acquires a user space image. The viewpoint position calculation unit 101 executes, for example, facial recognition processing based on the user space image captured by the user space image capture unit 202, and detects the user viewpoint position 204 of each user 203.

Although there is no particular limitation on the method for using the image display system 100, in addition to using the screen 201 of the display 104 as a simulated window to improve indoor scenery, use of the screen 201 as a device for allowing the users 203 to experience virtual reality or augmented reality in a stationary entertainment device in an entertainment facility such as a game center or a theme park, or in the home, use of the screen 201 as an eye-catching object exhibited indoors or outdoors as a work of art or advertisement, and the like are envisioned. The display 104 of the image display system 100 can be used as a display device in virtual reality or augmented reality technology, and can allow the users 203 to experience realistic virtual reality or augmented reality, similar to a head-mounted display (HMD), and there is no need for the users 203 to wear devices on their heads.

Although there is no particular limitation on the installation location of the image display system 100, for example, when used indoors in a hotel, office, residence, or the like, a hotel guest, an office worker working in an office, a resident of a residence, or the like is the user 203 (FIG. 2), and the inside of the room where the display 104 is installed is the user space. When used at an entertainment facility, a participant is the user 203, and the space where the image display system 100 is used and the range in which the participant can move (in this case, this includes various postures such as sitting, lying on one's back, lying on one's stomach, etc.) is the user space. In this embodiment, the number of users 203 may be one, but it is assumed that the number of users 203 is more than one. In this embodiment, when a plurality of users 203 simultaneously view the display 104, it is possible to view stereoscopic images or videos according to the respective positions of the users 203.

The storage unit 105 is either a volatile memory or a nonvolatile memory, or both. The storage unit 105 stores screen arrangement data indicating the position, orientation, and shape of the screen 201 in the predetermined reference coordinate space, image capture unit arrangement data indicating the positions and orientations of the user space image capture units 202-1 and 202-2 in the reference coordinate space, three-dimensional data representing a virtual three-dimensional object in the reference coordinate space, and one or more pieces of user viewpoint position data. The reference coordinate space is a space represented by a coordinate system (reference coordinate system) having a predetermined origin O that serves as a reference for calculation in this embodiment.

The reference coordinate space and the origin O thereof shown in FIG. 2 may be set in any manner. For example, the reference coordinate space may be fixed to the screen 201, fixed to the user space image capture unit 202, fixed to both the screen 201 and the user space image capture unit 202, or fixed to neither the screen 201 nor the user space image capture unit 202.

In the example of FIG. 2, the reference coordinate space is a space of an orthogonal coordinate system having three axes, namely an x axis, a y axis, and a z axis. The position $(x_s, y_s, z_s)$ and orientation $(Yaw_s, Pitch_s, Roll_s)$ 206 of the user space image capture unit 202 and the position $(x_m, y_m, z_m)$, orientation $(Yaw_m, Pitch_m, Roll_m)$, and shape $(Height_m, Width_m)$ 205 of the screen 201 are set in this reference coordinate space. Note that here, as an example, the screen 201 is rectangular, and the shape thereof is expressed by height and width.

Also, in this embodiment, as an example, the center position $(x_h, y_h, z_h)$ of the head of the user 203 in the reference space is set as the user viewpoint position 204. The user viewpoint position 204 may be the position of the viewpoint of the user 203 or the position of a point that can be regarded as the viewpoint of the user 203. There is no limitation to the example of this embodiment. As another example, the center of both eyes of the user 203 may also be set as the user viewpoint position 204 of the user 203. Also, the user viewpoint position 204 may be the center of a face region recognized through facial recognition processing or person recognition processing, or the center of both recognized eyes.

Also, in this embodiment, as an example, the center of the lens of the user space image capture unit 202 is set as the position 206 $(x_s, y_s, z_s)$ of the user space image capture unit 202. Also, here, as an example, the center of the screen 201 is set as the position 205 $(x_m, y_m, z_m)$ of the screen 201.

The aforementioned viewpoint position calculation unit 101 is, for example, a processor that executes a viewpoint position calculation processing program (see step S701 in FIG. 7, which will be described later). The viewpoint position calculation unit 101 specifies the user viewpoint positions 204 of the one or more users 203 in the reference coordinate space based on the position 206 of the user space image capture unit 202 stored in the storage unit 105 and the user space images acquired by the two user space image capture units 202-1 and 202-2.

The image generation unit 102 may be the same processor as the viewpoint position calculation unit 101, which executes a display image generation processing program (see step S702 in FIG. 7, which will be described later) for each user. The image generation unit 102 generates a display image of the three-dimensional object based on the user viewpoint position 204 calculated by the viewpoint position calculation unit 101 and the screen arrangement data and three-dimensional data stored in the storage unit 105, the three-dimensional object in the display image appearing in the same manner as when the three-dimensional object in the virtual space is being viewed via the screen 201 from the user viewpoint position 204.

The image display unit 103 may be the same processor as the viewpoint position calculation unit 101, which executes a display control processing program (see step S703 in FIG. 7, which will be described later) for each user. The image display unit 103 causes the screen 201 of the display 104 to display, for each of the user viewpoint positions 204 of the user 203, the display image generated by the image generation unit 102 so as to correspond to the user viewpoint position 204, the display image being displayed in the user viewpoint position direction corresponding to the user viewpoint position 204.

As a result, to each user 203, the three-dimensional object appears as if the three-dimensional object were present in the virtual space, through the screen 201 of the display 104.

Note that when specifying the user viewpoint position 204 of the user 203, for example, the viewpoint position calculation unit 101 may specify the person (user 203) in each captured image acquired at the same time by the two user space image capture units 202-1 and 202-2, specify the position of the head of the user 203 in the captured image, and calculate the distances from the user space image capture units 202-1 and 202-2 to the head of the user 203 based on the image capture unit arrangement data and a parallax of the head of the user 203 in the two user space images. Using the principle of triangulation, the accurate user viewpoint position 204 can be specified with a simple configuration.

However, the configuration and method for specifying the user viewpoint position 204 are not limited to those using a stereo sensor shown here, and any type of method can be adopted. As another example, it is also possible to use a method in which the user space image capture unit 202 emits infrared lasers with a dot pattern having a large number of dots, and the distances from the user space image capture unit 202 to the portions hit by the infrared lasers are calculated from the image of the portions hit by the infrared lasers in the captured image. The infrared lasers and/or the dot pattern thereof have a predetermined spread angle, and the farther away from the user space image capture unit 202 the portions hit by the dots of the infrared lasers are, the larger the sizes of the dots and/or the intervals between the dots are. The distances from the user space image capture unit 202 to the portions hit by the infrared lasers can be calculated from the sizes of the dots and/or the intervals between the dots.

As yet another example, it is also possible to use a method in which the user space image capture unit 202 emits modulated infrared light, projects the infrared light reflected back by an object onto an array sensor for each pixel, and calculates the distance from the user space image capture unit 202 to the object reflecting the infrared laser based on the phase difference between the emitted infrared light and the received infrared light for each pixel. As yet another example, there is a technique in which the distance of an object in an image captured by a monocular image capture device is calculated from the image, and this technique may also be adopted in the user space image capture unit 202. As yet another example, there is also a technique in which a physical marker having a predetermined shape and/or size that is easy for a sensor to detect, or a marker that is a light-emitting object emitting predetermined light, such as an infrared LED, is attached to the user or an object held or worn by the user 203 and the user viewpoint position 204 is specified based on the position of the marker, and this technique may also be adopted in the user space image capture unit 202.

The display 104 and the user space image capture unit 202 according to this embodiment may also be formed as devices that each have a separate housing, as illustrated in FIG. 2, or may be formed in one piece with one housing. When the display 104 and the user space image capture unit 202 are formed as separate devices, both the viewpoint position calculation unit 101 and the image generation unit 102 may be provided in either the display 104 or the user space image capture unit 202, or the viewpoint position calculation unit 101 and the image generation unit 102 may be provided separately in the display 104 and the user space image capture unit 202. In this case, the display 104 and the user space image capture unit 202 communicate by wire or wirelessly.

Figure 3:
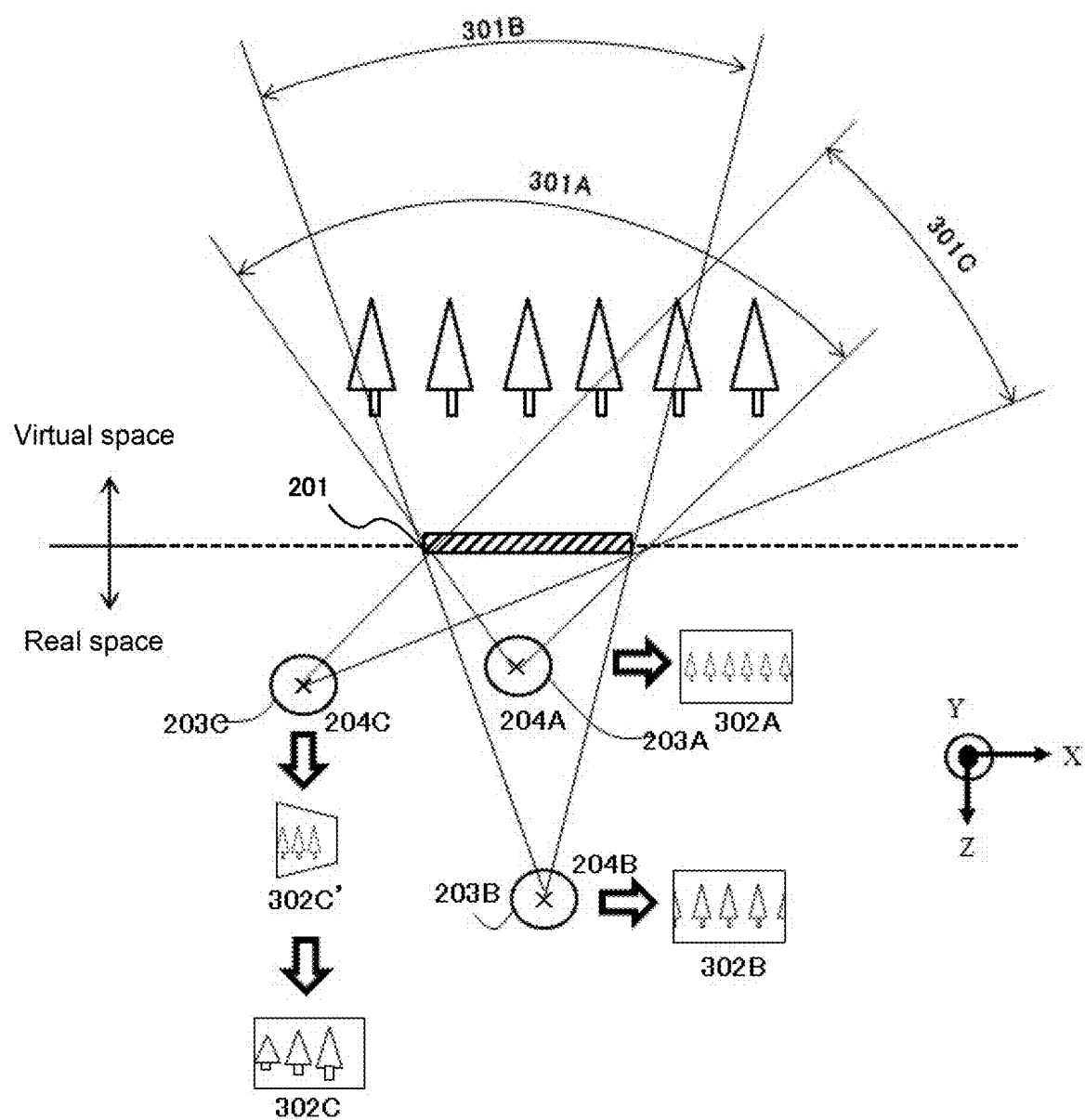
FIG. 3 is an illustrative diagram of an image generation unit according to an embodiment.

FIG. 3 is an illustrative diagram of the image generation unit 102 according to an embodiment. The user space in front of the screen 201 of the display 104 is a real space. A virtual space defined behind the screen 201 is displayed on the screen 201 as display images that can be viewed through simulated windows (hereinafter referred to as "simulated windows") on the screen 201 from the user viewpoint positions 204 (A, B, C) where the heads of the users 203 (A, B, C) are located. A three-dimensional object in the virtual space is defined by the three-dimensional data. In the example of FIG. 3, six trees are arranged side by side as three-dimensional objects. Note that here, although the virtual space is defined behind the screen 201 for description in FIG. 3, the virtual space may also be defined in front of the screen 201, and a space including both in front of and behind the screen 201 may also be defined as the virtual space. As a result, not only an image in which a three-dimensional object in the virtual space appears to be behind the simulated window on the screen 201, but also an image in which a three-dimensional object in the virtual space appears to be protruding frontward from the screen 201 can be displayed on the screen 201.

When the user 203 is at the user viewpoint position 204A near and in front of the screen 201 of the display 104, the field of view 301A of the virtual space viewed through the simulated window on the screen 201 is wide, and is displayed on the screen 201 such that the six trees are all in the field of view 301A (display 302A). When the user 203 moves in the z direction from the user viewpoint position 204A and comes to the user viewpoint position 204B away from the screen 201, a field of view 301B of the virtual space viewed through the simulated window on the screen 201 becomes narrower, and display is performed such that the entireties of three trees and parts of the trees on both sides thereof are in the field of view 301B (display 302B). Also, when the user 203 moves in the −x (minus x) direction from the user viewpoint position 204A and comes to the user viewpoint position 204C, the field of view 301C of the virtual space viewed through the simulated window on the screen 201 changes in the x direction. The field of view 301C only includes the three trees on the right end. In addition, in the field of view 301C, the screen 201 is viewed diagonally rather than from the front, but the horizontal thickness of the trees visible through the simulated window need to be the same thickness as when viewed from the front (display 302C'). For this reason, when displaying a tree on the screen 201, an image that has been appropriately expanded and contracted so as to look like 302C' to the user 203 is displayed (display 302C). In this manner, in this embodiment, when generating an image to be displayed on the screen 201 of the display 104, processing (projective transformation) for projecting a three-dimensional object in the virtual space defined in the three-dimensional data onto the screen 201 of the display 104, that is, a three-dimensional surface, is performed as processing by which the three-dimensional object in the virtual space appears to the user 203 as a feasible and natural image to give an optical illusion as though the three-dimensional object in the virtual space were present there. As another method, each point of the three-dimensional data may be projected onto a point where a straight line connecting each point and the user viewpoint position 204 intersects the screen 201 in the reference coordinate space. Also, as another processing method for generating the image to be displayed on the screen 201 of the display 104, four arithmetic operations on specific matrices and numerical values according to empirical rules may be performed on the image and three-dimensional parameters of the image.

Also, according to the present embodiment, the screen 201 and the user space image capture unit 202 are arranged in the same reference coordinate space, and the user viewpoint position and display image are calculated in that reference coordinate space, and therefore a common design can be easily applied to a system in which the relative positions and/or orientations of the user space image capture unit 202 and the display 104 are different. For example, if there are a plurality of types with different image sizes and shapes, the relative positions and orientations of the user space image capture unit 202 and the display 104 are different for each type, not only in a system of a type in which the user space image capture unit 202 and the display 104 are separate devices and the positions at which they are arranged can be freely selected, but also in a system in which the user space image capture unit 202 and the display 104 are formed in one piece and the relative positions and orientations thereof are fixed. A common design can be applied to these different types.

Also, when a plurality of displays 104 are used in the same room, the screens 201 of the plurality of displays 104 can be arranged in the same reference coordinate space and the display images on the screens 104 can be calculated using a common calculation method in that reference coordinate space, no matter what position and angle the displays 104 are installed in. Also, the images of the plurality of displays 104 in the same room can be made continuous with each other with high precision. This exhibits a high visual effect in improving the interior scenery of a hotel, residence, office, or the like.

Figure 4:
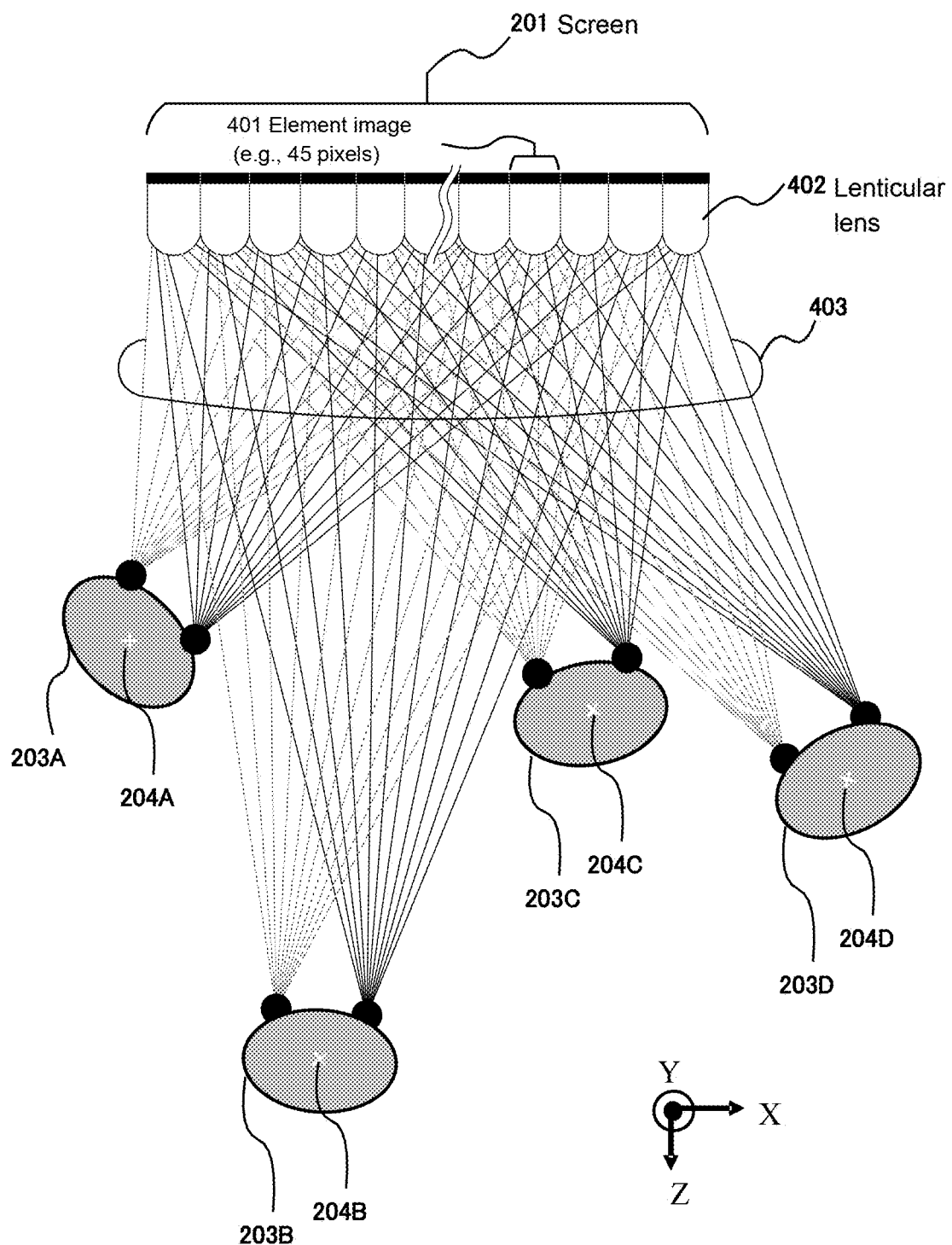
FIG. 4 is an illustrative diagram (part 1) of an image display unit and a display.
Figure 5:
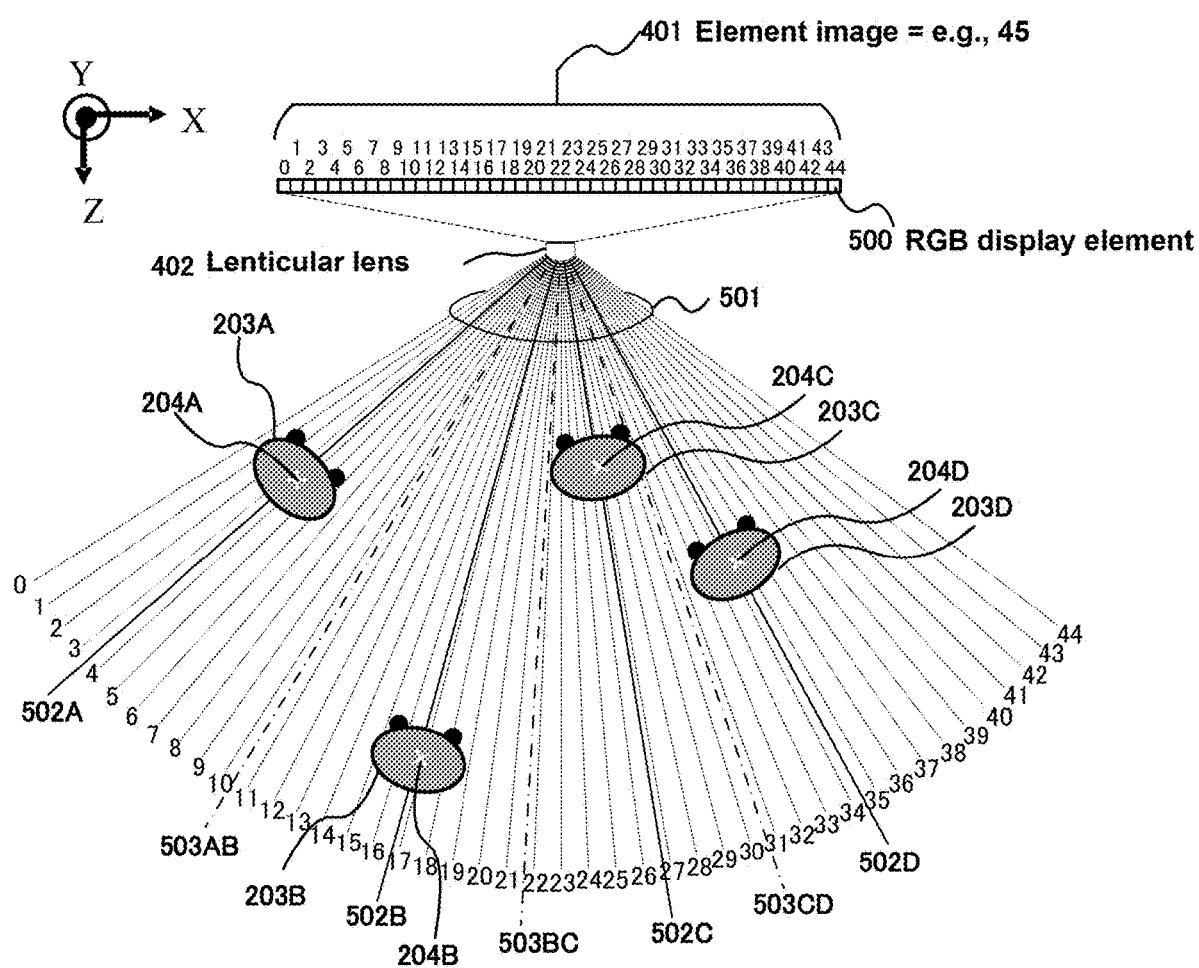
FIG. 5 is an illustrative diagram (part 2) of an image display unit and a display.

FIGS. 4 and 5 are illustrative diagrams of the image display unit 103 and the display 104. In this embodiment, in the description of FIG. 3, a plurality of users 203 are simultaneously standing in front of the display 104, and the above-mentioned viewpoint position calculation unit 101 can simultaneously detect the plurality of user viewpoint positions 204 corresponding to the plurality of users 203.

In this case, a plurality of pieces of pixel display data cannot be simultaneously displayed at the display pixel positions on a liquid crystal screen of a normal display or the like.

In contrast, the display 104 in this embodiment has a screen 201 that can simultaneously display different images in a plurality of display directions. Specifically, in the display 104 having the configuration shown in FIGS. 4 and 5, the screen 201 is configured as sets in units of 45 pixels. Hereinafter, this unit will be referred to as an element image 401. That is, one element image 401 consists of 45 pixels, and RGB display elements 500 are arranged in each pixel. The RGB display elements 500 are each constituted by three sub-pixel display elements that display three colors, namely R (red), G (green), and B (blue). The RGB display elements may also be display elements of four colors. An element image 401 consisting of 45 pixels corresponds to one pixel of a general display.

At the same time, each elemental image 401 includes a lens element 402, which is a semicircular cylindrical lens called a lenticular lens, which is for refracting the directions of the optical paths of 45 RGB lights displayed by the RGB display elements 500 for the 45 pixels in the element image 401, for example, in 45 display directions (hereinafter these directions are described as "display directions 501"), namely 0th to 44th display directions, which are shown in FIG. 5.

Then, the above-described image display unit 103 inputs data of display images (see 302A, 302B, 302C, and the like in FIG. 3) generated by the image generation unit 102 for each of the user viewpoint positions 204A, 204B, 204C, 204D, and the like so as to correspond to the user viewpoint positions, into the RGB display elements 500 of the pixel numbers corresponding to the directions 502A, 502B, 502C, and 502D from a predetermined origin O (e.g., a central position of the image 201) in, for example, the reference coordinate space (FIG. 2), to the user viewpoint positions 204A, 204B, 204C, and 204D. Hereinafter, these directions will be described as user viewpoint position directions 502A, 502B, 502C, and 502D. Alternatively, these directions are collectively referred to as user viewpoint position directions 502.

Here, the image generation unit 102 may generate, for each of the user viewpoint positions 204A, 204B, 204C, and 204D of the users 203A, 203B, 203C, and 203D detected by the viewpoint position calculation unit 101, a right-eye display image and a left-eye display image in which the three-dimensional object appears in the same manner as when the three-dimensional object in the virtual reference space is being viewed via the screen 201 respectively from the right eye and the left eye of the user located a certain distance away to the left and right from the user viewpoint position. In this case, the image display unit 103 causes the RGB display elements 500 of the pixel numbers corresponding to the right-eye display direction and the RGB display elements 500 of the pixel numbers corresponding to the left-eye display direction, which are located on both sides of each of the user viewpoint position directions 502A, 502B, 502C, and 502D corresponding to the user viewpoint positions, to display, for each of the user viewpoint positions 204A, B, C, and D of the users 203A, 203B, 203C, and 203D, the above-mentioned right-eye display image and left-eye display image generated corresponding to the user viewpoint position.

As a result of the above-described control operation, for each of the users 203A, 203B, 203C, and 203D in FIG. 4, it is possible to simultaneously display, on the display 104, images whose display states in the virtual space are controlled for each user 203, to the plurality of users 203A, 203B, 203C, and 203D located at various positions, as indicated by line-of-sight directions 403 connecting the left eyes and right eyes and the lens elements 402, and as described using the displays 302A, 302B, 302C, and the like of FIG. 3.

In this case, each of the users 203A, 203B, 203C, and 203D receives images with binocular parallax in the right and left eyes, and therefore it is possible to experience stereoscopic vision with the naked eye with a sense of realism.

Hereinafter, operations of the image display system 100 will be described in detail.

Figure 6:
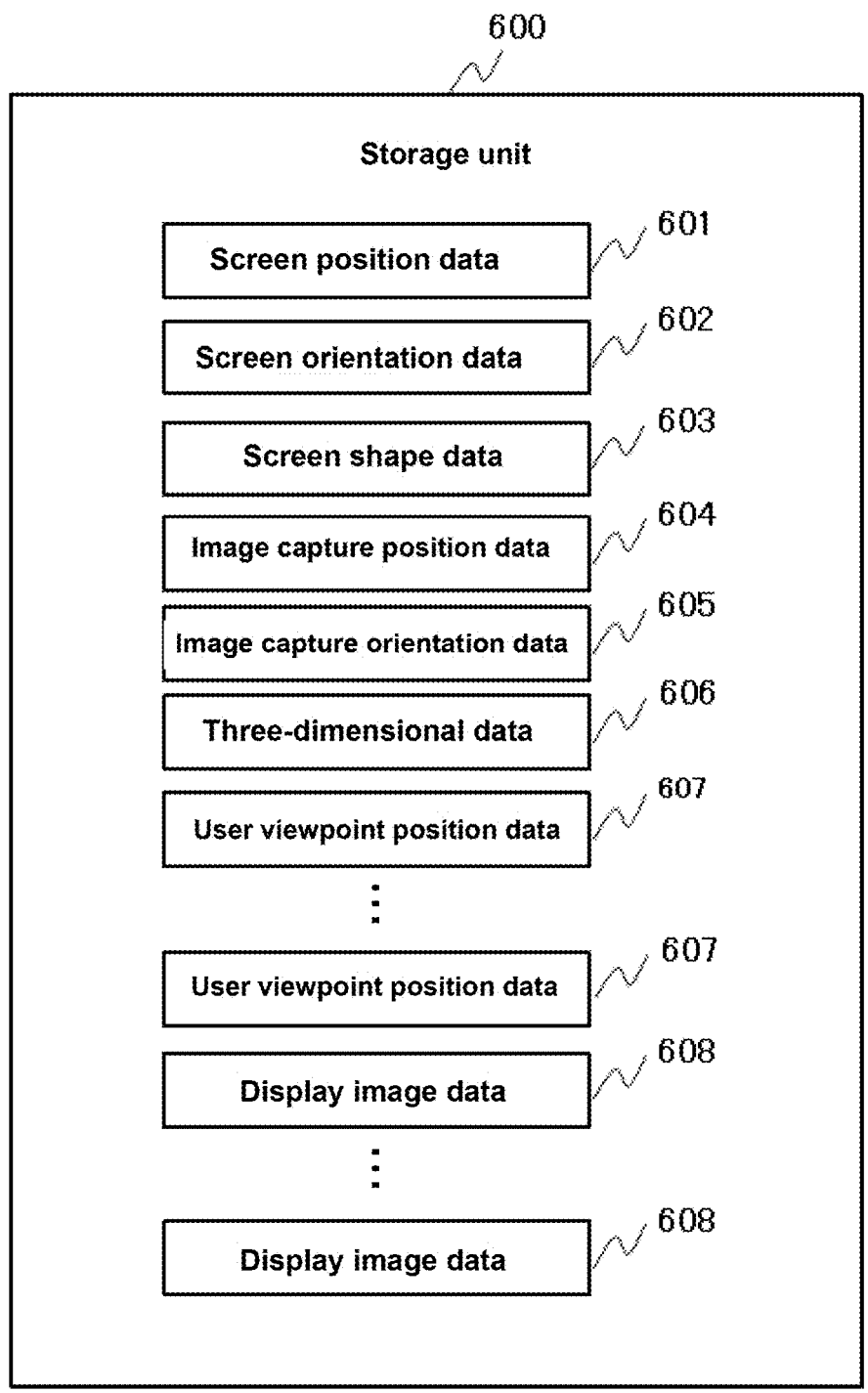
FIG. 6 is a diagram showing an example of a structure of data stored in a storage unit.

FIG. 6 is a diagram showing an example of a data structure recorded in the storage unit 105 in an embodiment. In FIG. 6, screen position data 601, screen orientation data 602, screen shape data 603, image capture position data 604, image capture orientation data 605, three-dimensional data 606, user viewpoint position data 607 corresponding to one or more users 203, and display image data 608 corresponding to one or more users 203 are recorded in the storage unit 105. The screen arrangement data described above includes the screen position data 601, the screen orientation data 602, and the screen shape data 603 mentioned here. Also, the above-described image capture unit arrangement data includes the image capture position data 604 and the image capture orientation data 605 mentioned here.

The screen position data 601 is data representing the position ($x_m$, $y_m$, $z_m$) of the screen 201 (see FIG. 2). The position ($x_m$, $y_m$, $z_m$) of the screen 201 may be determined and set when the display 104 is installed, and the display 104 may be moved freely and the numerical value of the position information recorded in the storage unit 105 may be constantly updated according to the movement. When using a plurality of displays 104, the respective positions ($x_m$, $y_m$, $z_m$) thereof are set.

The screen orientation data 602 is data representing the orientation ($Yaw_m$, $Pitch_m$, $Roll_m$) of the screen 201 (see FIG. 2). The orientation ($Yaw_m$, $Pitch_m$, $Roll_m$) of the screen 201 may be determined and set when the display 104 is installed, or may be set as a fixed value in advance together with an installation condition of the display 104 at the time of design or shipment. For example, the installation condition may be that the display 104 is placed horizontally and fixed to a wall surface, and the orientation ($Yaw_m$, $Pitch_m$, $Roll_m$) when installed may be set in advance according to the installation condition. Alternatively, the display 104 may be freely rotated after installation, and the numerical value of the orientation information recorded in the storage unit 105 may be constantly updated in accordance with the rotation. When using a plurality of displays 104, the respective orientations ($Yaw_m$, $Pitch_m$, $Roll_m$) thereof are set.

The screen shape data 603 is data representing the shape ($Height_m$, $Width_m$) of the screen 201. The shape ($Height_m$, $Width_m$) of the screen 201 may be set as a fixed value for the display 104 in advance at the time of design or shipping, or the display 104 may be freely deformed after installation and the numerical value of the shape information recorded in the storage unit 105 may be constantly updated according to the deformation. When using a plurality of displays 104, the respective shapes ($Height_m$, $Width_m$) thereof are set. Note that although the shapes of the screen 201 are assumed to be rectangular, $Height_m$ is the numeric value of the length in the height direction, and $Width_m$ is the numeric value of the length in the width direction, the shapes of the screens 201 are not limited to being rectangular. For example, the screen 201 may be an isosceles triangle, and its shape may be expressed by the length of the lower base and the height. Also, the screen 201 may be a trapezoid, and its shape may be expressed by the upper base, the lower base, and the height. It is also possible to use a curved screen as the screen 201. If the screen has a rectangular plane curved at a specific curvature, the shape thereof can be expressed by the height and width of the rectangle, and the curvature or radius. Similarly, screens of various shapes, such as a sphere, an elongated sphere, an oblate sphere, and a body of revolution, may be expressed using parameters that characterize each shape. The shape of any screen, including those illustrated here, can be defined in the reference coordinate space, and the image to be displayed thereon can be calculated.

The image capture position data 604 is data representing the respective positions ($x_s$, $y_s$, $z_s$) (see FIG. 2) of the user space image capture units 202-1 and 202-2 described above. The positions ($x_s$, $y_s$, $z_s$) in the image capture position data 604 are determined and set when the user space image capture unit 202 is installed.

The image capture orientation data 605 is data representing the orientations ($Yaw_s$, $Pitch_s$, $Roll_s$) (see FIG. 2) of the user space image capture units 202-1 and 202-2 described above. The orientations ($Yaw_s$, $Pitch_s$, $Roll_s$) of the image capture orientation data 605 may be determined and set when the user space image capture unit 202 is installed, or may be determined together with the installation condition of the user space image capture unit 202 and set as a fixed value in advance.

The three-dimensional data 606 is three-dimensional data that is the basis for generating the image to be displayed on the display 104, and is three-dimensional data that expresses a three-dimensional object in a virtual space as illustrated in FIG. 3. The three-dimensional data 606 mentioned here may be any data that expresses a three-dimensional object in a three-dimensional space, and there is no particular limitation to a specific method. The three-dimensional data 606 may be data with three-dimensional information created through computer graphics, or may be data in which a photographed still image or moving image is pasted onto a flat three-dimensional object with no thickness. The three-dimensional data 606 may also be data in which a still image or a moving image captured using a camera with a lens with a wide viewing angle of 180° or close to 180°, or a 360° imaging camera is pasted onto the surface of a spherical object with no thickness.

The user viewpoint position data 607 is data representing the user viewpoint position 204 described above. Since the user viewpoint position 204 is repeatedly updated by the viewpoint position calculation unit 101, the user viewpoint position data 607 is also updated each time. For example, if the frame rate of the display 104 is 30 fps (frames/second) and the user viewpoint position 204 is updated at the same period, the user viewpoint position data 607 will be updated 30 times per second. In the user viewpoint position data 607, chronological data of the user viewpoint position 204 is accumulated.

Also, since a plurality of user viewpoint positions 204 are simultaneously detected for a plurality of users 203 that can be present in the user space, a plurality of pieces of user viewpoint position data 607 can also be stored.

The display image data 608 is data of an image obtained by projecting the three-dimensional data 606 such that it appears from the user viewpoint position 204 as if there were a three-dimensional object in the space behind the simulated window on the screen 201, and the display image data 608 is data of a display image generated by the image generation unit 102 and displayed on the screen 201. Since the data of the display image displayed on the screen 201 is repeatedly updated by the image generation unit 102, the display image data 608 is also updated each time. For example, if the frame rate of the display 104 is 30 fps, the display image data 608 will be updated 30 times per second. If there are a plurality of displays 104, the data displayed on the screen 201 of each display 104 is recorded as the display image data 608.

Also, since a plurality of display images are simultaneously generated by the image generation unit 102 for a plurality of users 203 that can be present in the user space, a plurality of pieces of display image data 608 can also be stored.

Figure 7:
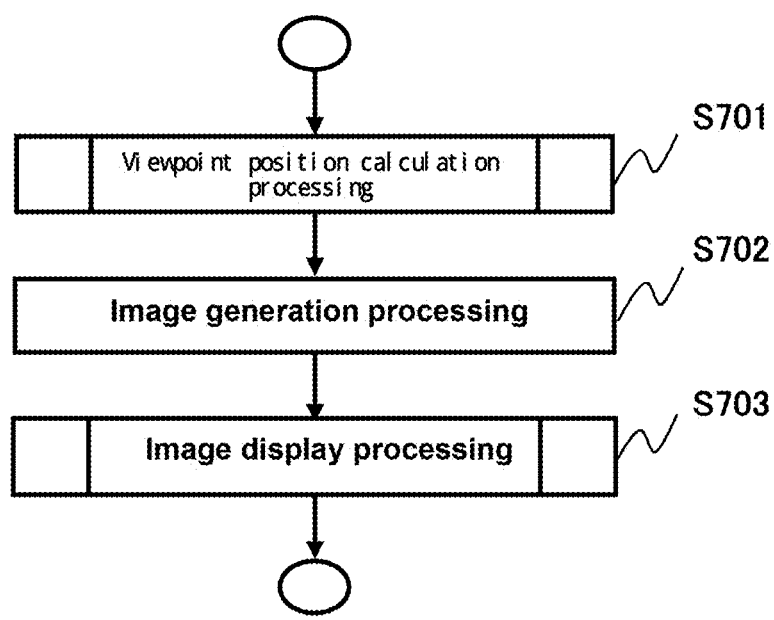
FIG. 7 is a flowchart illustrating an example of overall processing of the image display system according to an embodiment.

FIG. 7 is a flowchart of the overall processing of the image display system 100 of FIG. 1 according to an embodiment. The processing shown in FIG. 7 is executed by a processor that realizes the viewpoint position calculation unit 101, the image generation unit 102, and the image display unit 103 in FIG. 1. Due to this processor periodically repeating the processing of FIG. 7, the image displayed on display 104 changes over time, and is recognized by the user 203 as a moving image. For example, if the frame rate of the image displayed on the display 104 is 30 fps, the above-described processor will repeat the processing shown in FIG. 7 30 times per second.

In FIG. 7, the viewpoint position calculation unit 101, which is realized, for example, as a function of a processor executing a viewpoint position calculation processing program or a function of dedicated hardware, first executes viewpoint position calculation processing (step S701). This processing is processing for calculating the above-described user viewpoint position 204 and recording the calculated user viewpoint position 204 in the storage unit 105 as user viewpoint position data 607. Details of this processing will be described later with reference to FIG. 8.

Next, the image generation unit 102, which is realized as a function in which the same or a different processor as the viewpoint position calculation unit 101 executes the image generation processing program, or a function using dedicated hardware, executes image generation processing (step S702). This processing is processing for generating an image of a three-dimensional object visible through the screen 201 from the user viewpoint position 204 indicated by the user viewpoint position data 607 recorded in the storage unit 105, and recording the data thereof in the storage unit 105. When there are a plurality of displays 104, the image generation unit 102 generates images to be displayed on the screens 201 of the respective displays 104, and records the data as display image data 608. When there are a plurality of user viewpoint positions 204, images for the plurality of user viewpoint positions are generated for each of the screens 201 of the plurality of displays 104, and the data thereof is recorded as a plurality of pieces of display image data 608.

Next, the image display unit 103, which is realized as a function in which the same or a different processor as the viewpoint position calculation unit 101 executes the image display processing program, or a function using dedicated hardware, executes image display processing (step S703). This processing is processing for displaying the images of the three-dimensional object visible through the screen 201 to the users 203 located at the user viewpoint position 204 via the screen 201 of the display 104, based on the display image data 608 for each user 203 recorded in the storage unit 105. When there are a plurality of displays 104, the image display unit 103 causes each display 104 to display data of an image of the three-dimensional object that is visible through the screen 201 of each display 104. Details of this processing will be described later with reference to FIG. 9. For example, as shown in FIG. 2, when the display 104 and the stereo sensor having the user space image capture units 201-1 and 202-2 are configured as separate devices, the stereo sensor may be responsible for step S701, and the display 104 may be responsible for steps S702 and S703.

The image generation unit 102 according to this embodiment may generate a display image of a three-dimensional object visible through the screen 201 from each user viewpoint position 204 by applying projective transformation to the three-dimensional data 606. Through projective transformation, the three-dimensional object of the three-dimensional data 606 is mathematically projected onto the screen 201 with consideration given to the user viewpoint position 204, and therefore even when each user 203 views the screen 201 from an oblique direction, the three-dimensional object is displayed as a feasible natural image according to the user viewpoint position 204 of each user 203.

Also, the viewpoint position calculation unit 101 may perform processing for removing noise included in the user viewpoint position 204 based on the chronological user space images up to the present time, which were obtained by the user space image capture unit 202, the user viewpoint positions 204, or both. When the user viewpoint position 204 is calculated using the result of performing image processing on the most recent captured user space image as-is, and an image of a three-dimensional object that is visible from the user viewpoint position 204 is generated, there is a possibility that the user viewpoint position 204 will be suddenly calculated as a significantly shifted position due to various noise elements that occurred only at that point in time, and as a result, the displayed image will be blurred in each frame. According to this configuration, the current user viewpoint position 204 is determined after noise in the user viewpoint position 204 is removed based on past user space images and user viewpoint positions 204, and therefore blurring of the displayed image can be suppressed. As a method for removing noise, there is a method in which noise is determined based on data of past user space images, and noise is removed from the current space image based on the determination result. Also, there is a method of updating (or correcting) the current user viewpoint position 204 using a Kalman filter based on the data of the past user viewpoint position 204 and the data of the current user viewpoint position 204.

Figure 8:
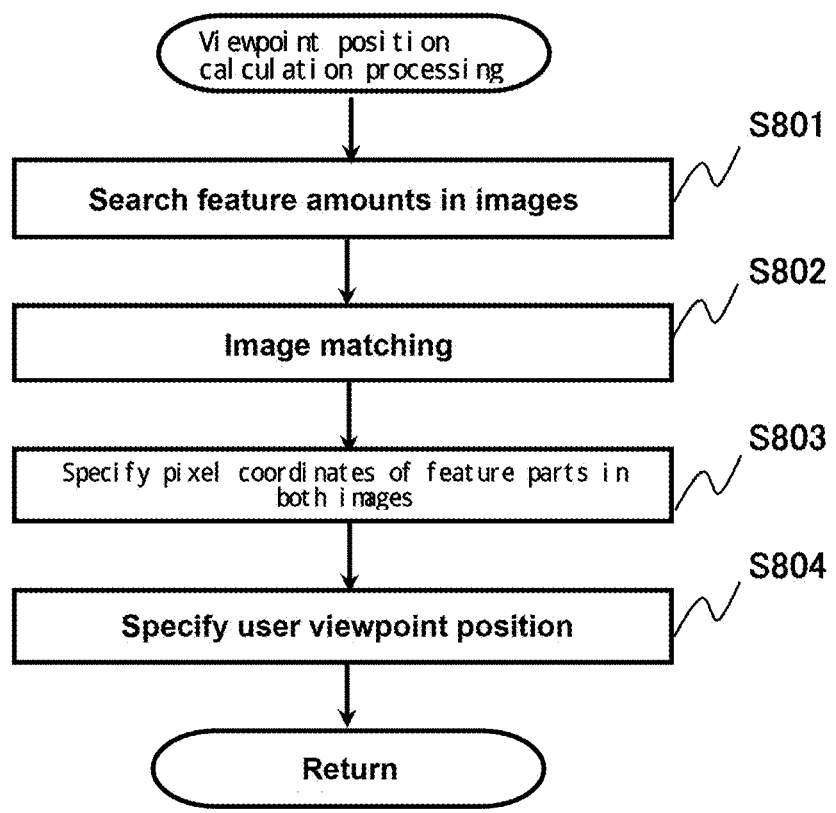
FIG. 8 is a flowchart showing a detailed example of viewpoint position calculation processing.

FIG. 8 is a flowchart showing a detailed example of the viewpoint position calculation processing of step S701 of FIG. 7.

In FIG. 8, the viewpoint position calculation unit 101 first executes a feature quantity search in the user space image (step S801). In this processing, the head of a human being (user 203) is detected from an image of either the user space image capture unit 202-1 or 202-2. The processing for detecting the head of a human from an image can be performed using, for example, facial recognition technology. At this time, a method of recognizing a face pattern based on a difference in brightness using Haar-like features may be used. The method may also be a method of recognizing the face position using a learning device (trained artificial intelligence program) that is trained through deep learning or machine learning and directly recognizes the user 203 from images, or directly recognizing the center position of the head from a body skeleton. At this time, a plurality of heads can be simultaneously detected so as to correspond to the plurality of users 203 that can be present.

Next, the viewpoint position calculation unit 101 executes image matching processing (step S802). This processing is processing for comparing the user space images obtained by the user space image capture units 202-1 and 202-2, and specifying feature portions recognized as one or more users 203 searched in one of the user space images in step S801, and a location in the other user space image where the same thing appears.

Next, the viewpoint position calculation unit 101 specifies the pixel coordinates of the feature portions in both user space images (step 803). Here, the viewpoint position calculation unit 101 acquires the pixel coordinates in the user space images for the respective feature portions in the user space image captured by the user space image capture unit 202-1 and the respective feature portions in the user space image captured by the user space image capture unit 202-2.

Next, the viewpoint position calculation unit 101 identifies the user viewpoint position 204 by associating each pixel with three-dimensional coordinates based on the result of the image matching processing (step S804). When the pixel coordinates of locations where the same thing appears in the two images are identified through the processing of step S803, the three-dimensional coordinates of that location can be identified using the principle of triangulation.

If the identified locations are the heads of one or more users 203, the respective three-dimensional coordinates will be identified as the user viewpoint positions 204. At this time, the viewpoint position calculation unit 101 may, for example, set the position of the center of the head as the head position ($x_h$, $y_h$, $z_h$) (see FIG. 2). In this case, the radius of the head is estimated from the user space image, and the three-dimensional coordinates of a position that is located a distance equal to the radius away from the center surface of the head in the depth direction is the head position. Specifically, the radius may be added to a z value of the three-dimensional coordinates of the central surface of the head.

Also, as another example, the viewpoint position calculation unit 101 may set the position of the center surface of the head in the user space image as the head position ($x_h$, $y_h$, $z_h$) (FIG. 2). In this case, the three-dimensional coordinates corresponding to the pixel where the center of the head is displayed are the head position.

As yet another example of the method for specifying the user viewpoint position 204, it is also possible to use a method in which the viewpoint position calculation unit 101 detects a region having human-like characteristics in the image, obtains the distances from the user space image capture units 202-1 and 202-2 to that feature region, and then, with the center position in the horizontal direction of that feature region set as $X_V$ and the position 10 cm below the apex of the feature region in the vertical direction set as $Y_V$, simply estimates the user viewpoint position 204 based on the pixel coordinates ($X_V$, $Y_V$) and the distances to the feature region. This estimates a position located 10 cm below the top of the head as the user viewpoint position 204.

Note that the head of the user 203 does not necessarily appear in both user space images obtained by the two user space image capture units 202-1 and 202-2. Due to the difference in the positions of the user space image capture unit 202-1 and the user space image capture unit 202-2, the influence of obstacles, and the like, the head of the user 203 may only appear in one of the user space images obtained by the two user space image capture units 202-1 and 202-2. In this case, the user viewpoint position 204 may not be estimated. As a result, the user viewpoint position 204 can be specified in a wide range and used for generating a display image.

For example, the viewpoint position calculation unit 101 may record at least one of the data of the images acquired by the user space image capture units 202-1 and 202-2 and information on the user viewpoint position 204 calculated from the images, and if a predetermined user part (here, the head) related to the user viewpoint position 204 appears in the user space images captured by the plurality of user space image capture units 202, the viewpoint position calculation unit 101 may calculate the user viewpoint position 204 based on the parallax of the plurality of user space images, and if a user part appears in only the user space image captured by one user space image capture unit 202, the viewpoint position calculation unit 101 may estimate the user viewpoint position 204 based on that one user space image and data of past user space images or past user viewpoint positions 204.

Also, in this embodiment, a case is possible in which the viewpoint position calculation unit 101 cannot detect the feature amount when the user 203 moves rapidly or due to the influence of the brightness of the room or the like, and the viewpoint position calculation unit 101 temporarily cannot calculate the user viewpoint position 204 of the user 203 from the images captured by the user space image capture units 202-1 and 202-2. In this case, the viewpoint position calculation unit 101 may estimate the current user viewpoint position 204 based on the past chronological user viewpoint positions 204 accumulated in the storage unit 105 as the user viewpoint position data 607. Specifically, the data of a three-dimensional vector indicating the movement speed and movement acceleration of the user 203 may be recorded based on the history of past user viewpoint positions 204, and the current user viewpoint position 204 may be estimated from these pieces of data. For example, if there are no obstructions ahead in the direction of movement, a position obtained by changing the speed from the most recent calculated movement speed according to the latest calculated movement acceleration and moving from the most recent calculated user viewpoint position up to the current time may be set as the current user viewpoint position 204.

Also, in this embodiment, the viewpoint position calculation unit 101 may correct the user viewpoint position 204, and the image generation unit 102 may generate an image of the three-dimensional object that can be viewed through the screen 201 based on the corrected user viewpoint position 204. As a result, the accuracy of the user viewpoint position 204 can be improved. For example, a plurality of stereo sensors including the user space image capture units 202-1 and 202-2 may be provided, and the user viewpoint position 204 may be estimated based on a least squares criterion from a plurality of user viewpoint positions acquired by these stereo sensors. Also, the user viewpoint position 204 may be estimated based on a least squares criterion from two or more user viewpoint positions obtained through any combination of two or more of stereo sensors including the two user space image capture units 202-1 and 202-2, sensors using infrared, which are illustrated as other sensors, sensors for measuring user positions using markers, and the like. Also, without using the viewpoint position calculation unit 101, the user viewpoint position may be defined in advance as a fixed spatial coordinate value and stored in the storage unit. At a plurality of user viewpoint positions, some or all of the values may be fixed.

Figure 9:
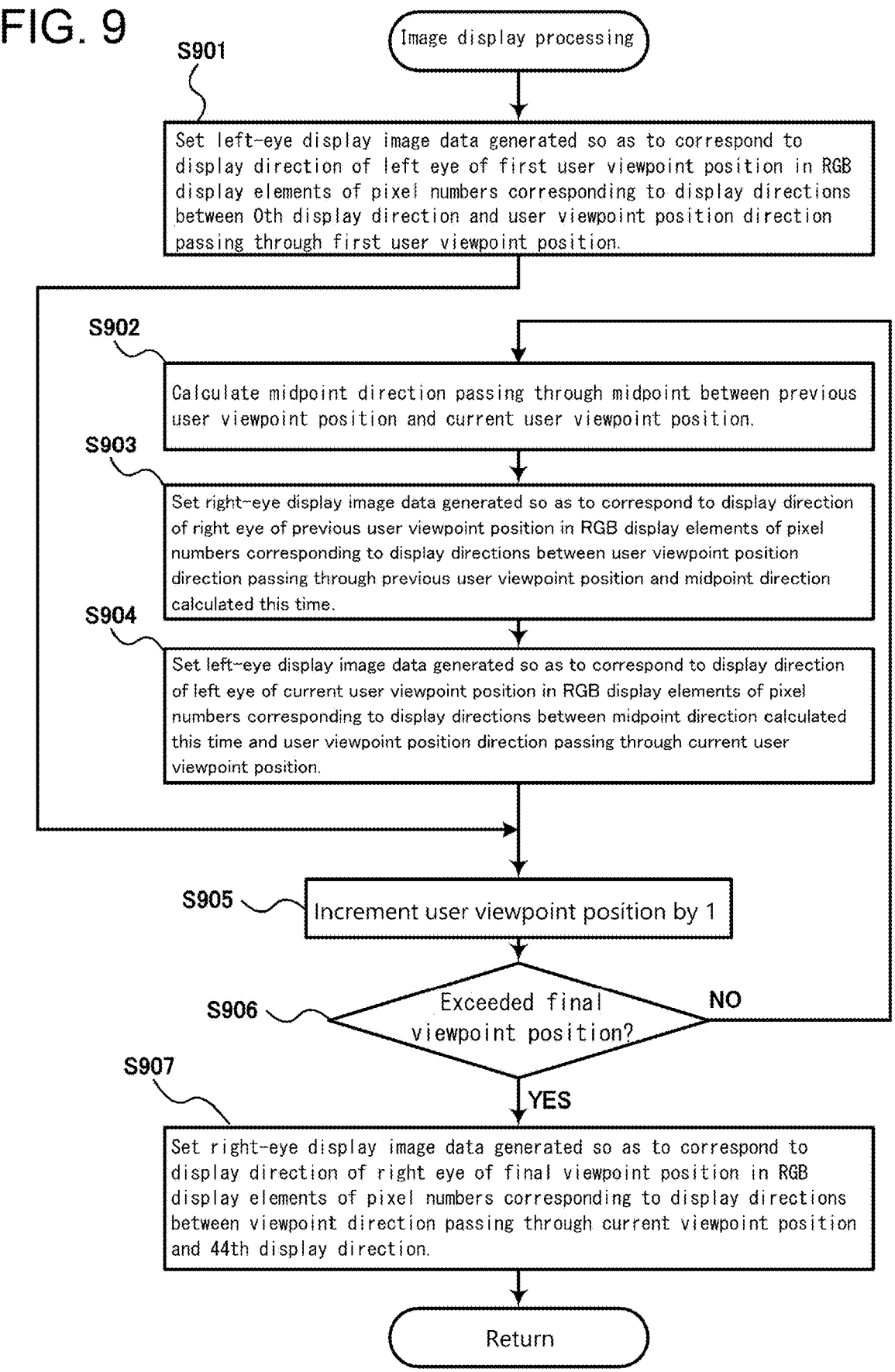
FIG. 9 is a flowchart showing a detailed example of image display processing.

FIG. 9 is a flowchart showing a detailed example of the image display processing of step S703 of FIG. 7. Hereinafter, this processing will be described according to the above-described illustrative diagram of FIG. 5. The image display unit 103, which is a function of a processor, sets left-eye display image data generated corresponding to a display direction of a left eye of the first viewpoint position 204 (e.g., 204A in FIG. 5) in the RGB display elements 500 of respective pixel numbers corresponding to, for example, the 0th to 3rd display directions 501 in FIG. 5 between, first, the 0th display direction among the 45 display directions 501, namely the 0th to 44th display directions 501, which were described with reference to FIG. 5, and the user viewpoint position direction 502 (e.g., 502A in FIG. 5) passing through the first viewpoint position 204 (e.g., 204A in FIG. 5) among the one or more viewpoint positions 204 calculated in step S701 in FIG. 7 (step S901). The processing of this setting is executed on the RGB display elements 500 of the above-described respective pixel numbers of the element images 401 (see FIG. 4) included in the screen 201.

Next, the image display unit 103 increments by 1 the variable value indicating, for example, the user viewpoint position 204, which is stored in a RAM or a register that is not particularly shown in the drawings (step S905).

Next, the image display unit 103 determines whether or not the above-described variable value indicating the user viewpoint position 204 has exceeded the final user viewpoint position 204 calculated in step S701 of FIG. 7 (step S906).

If processing has not been executed up to the final user viewpoint position 204 and the result of the determination in step S906 is NO, the image display unit 103 moves control to the processing of step S902 and executes the processing from step S902 to step S904.

First, the image display unit 103 calculates a midpoint direction 503 (e.g., 503AB of FIG. 5) that passes through a midpoint between the previous user viewpoint position 204 (e.g., 204A of FIG. 5) and the current user viewpoint position 204 (e.g., 204B of FIG. 5) (step S902).

Next, the image display unit 103 sets right-eye display image data generated corresponding to a display direction of a right eye of the previous user viewpoint position 204 (e.g., 204A in FIG. 5) in the RGB display elements 500 of respective pixel numbers corresponding to, for example, the 4th to 10th display directions 501 in FIG. 5 between the user viewpoint position direction 502 (e.g., 502A in FIG. 5) passing through the previous user viewpoint position 204 (e.g., 204A in FIG. 5) and the midpoint direction 503 (e.g., 503AB in FIG. 5) calculated this time (step S903). The processing of this setting is executed on the above-described RGB display elements 500 of the respective pixel numbers of the element images 401 (see FIG. 4) included in the screen 201.

Next, the image display unit 103 sets left-eye display image data generated corresponding to a display direction of a left eye of the current user viewpoint position 204 (e.g., 204B in FIG. 5) in the RGB display elements 500 of respective pixel numbers corresponding to, for example, the 11th to 16th display directions 501 in FIG. 5 between the midpoint direction 503 (e.g., 503AB in FIG. 5) calculated this time in step S902, and the user viewpoint position direction 502 (e.g., 502B in FIG. 5) passing through the current user viewpoint position 204 (e.g., 204B in FIG. 5) (step S904). The processing of this setting is executed on the above-described RGB display elements 500 of the respective pixel numbers of the element images 401 (see FIG. 4) included in the screen 201.

Thereafter, as described above, the image display unit 103 increments the variable value indicating the user viewpoint position 204 by 1 (step S905), and determines whether or not the resulting variable value has exceeded the final user viewpoint position 204 calculated in step S701 of FIG. 7 (step S906).

If processing has not yet been executed up to the final user viewpoint position 204 and the result of the determination of step S906 is NO, the image display unit 103 once again executes the above-described processing of steps S902 to S904.

In step S902, which is similar to that described above, for example, in FIG. 5, a midpoint direction 503BC passing through the midpoint between the previous user viewpoint position 204B and the current user viewpoint position 204C is calculated.

Next, in step S903, which is similar to that described above, for example, in FIG. 5, right-eye display image data generated corresponding to a display direction of a right eye of the previous user viewpoint position 204B is set in the RGB display elements 500 of respective pixel numbers corresponding to, for example, the 17th to 21st display directions 501 in FIG. 5 between the user viewpoint position direction 502B passing through the previous user viewpoint position 204B and the midpoint direction 503BC calculated this time. The processing of this setting is executed on the above-described RGB display elements 500 of the respective pixel numbers of the element images 401 (see FIG. 4) included in the screen 201.

Next, in step S904, which is similar to that described above, for example, in FIG. 5, left-eye display image data generated corresponding to a display direction of a left eye of the current user viewpoint position 204C is set in the RGB display elements 500 of respective pixel numbers corresponding to, for example, the 22nd to 26th display directions 501 in FIG. 5 between the midpoint direction 503BC calculated this time in step S902 and the user viewpoint position direction 502C passing through the current user viewpoint position 204C. The processing of this setting is executed on the above-described RGB display elements 500 of the respective pixel numbers of the element images 401 (see FIG. 4) included in the screen 201.

Thereafter, as described above, the image display unit 103 increments the variable value indicating the user viewpoint position 204 by 1 (step S905), and determines whether or not the variable value has exceeded the final user viewpoint position 204 calculated in step S701 of FIG. 7 (step S906).

If processing has not yet been executed up to the final user viewpoint position 204 and the result of the determination in step S906 is NO, the image display unit 103 once again executes the above-described processing of steps S902 to S904.

In step S902, which is similar to that described above, for example, in FIG. 5, a midpoint direction 503CD passing through the midpoint between the previous user viewpoint position 204C and the current user viewpoint position 204D is calculated.

Next, in step S903, which is similar to that described above, for example, in FIG. 5, right-eye display image data generated so as to correspond to the display direction of the right eye of the previous user viewpoint position 204C is set in the RGB display elements 500 of the respective pixel numbers corresponding to, for example, the 27th to 30th display directions 501 in FIG. 5 between the user viewpoint position direction 502C passing through the previous user viewpoint position 204C and the midpoint direction 503CD calculated this time. The processing of this setting is executed on the above-described RGB display elements 500 of the respective pixel numbers of the element images 401 (see FIG. 4) included in the screen 201.

Subsequently, in step S904, which is similar to that described above, for example, in FIG. 5, left-eye display data generated so as to correspond to the display direction of the left eye of the current user viewpoint position 204D is set in the RGB display elements 500 of the respective pixel numbers corresponding to, for example, the 31st to 34th display directions 501 in FIG. 5 between the midpoint direction 503CD calculated this time in step S902 and the user viewpoint position direction 502D passing through the current user viewpoint position 204D. The processing of this setting is executed on the above-described RGB display elements 500 of the respective pixel numbers of the element images 401 (see FIG. 4) included in the screen 201.

Thereafter, as described above, the image display unit 103 increments the variable value indicating the user viewpoint position 204 by 1 (step S905), and determines whether or not the variable value has exceeded the final user viewpoint position 204 calculated in step S701 of FIG. 7 (step S906).

If the result of the determination in step S906 becomes YES after processing is executed up to the final user viewpoint position 204, the image display unit 103 executes the processing of the final step S907. In step S907, the image display unit 103 sets right-eye display image data generated corresponding to the display direction of the right eye of the final user viewpoint position 204 (e.g., 204D in FIG. 5) in the RGB display elements of the respective pixel numbers corresponding to, for example, the 35th to 44th display directions 501 in FIG. 5 between the user viewpoint position direction 502 (e.g., 502D in FIG. 5) passing through the current user viewpoint position 204 (e.g., 204D in FIG. 5) and the 44th display direction 501.

Thereafter, the image display unit 103 ends the image display processing in step S703 of FIG. 7, which is illustrated in the flowchart of FIG. 9.

In the image display processing illustrated in the above-described flowchart of FIG. 9, the right-eye and left-eye display image data generated corresponding to the display directions of the right eyes and the left eyes of adjacent viewpoint positions 204 are copied and set in the display directions 501 of sections defined by the user viewpoint position directions 502 of the two user viewpoint positions 204 in FIG. 5 and the midpoint direction 503 passing through the midpoint between these two viewpoint positions 204. In contrast, using different algorithms for mapping display pixels to the display directions 501 for the user viewpoint position 204 of the user 203 near the screen 201 and the user viewpoint position 204 of the user 203 far from the screen 201, it is also possible to make the display pixel change sensitivity uniform according to the user viewpoint position 204 of the user 203.

Alternatively, instead of simply copying, display pixels calculated by performing interpolation processing according to each display direction 501 between two adjacent display images may be set.

Also, in this embodiment, the viewpoint position calculation unit 101 detects a predetermined gesture performed by the user 203 from the chronological user space images, and executes predetermined processing corresponding to the gesture. The user space image capture unit 202 acquires a user space image, and the viewpoint position detection unit 101 detects a predetermined gesture from the user space image and executes predetermined processing corresponding to the gesture, and therefore it is possible to perform a desired operation without a remote controller for operation, with a gesture operation performed by the user 203 in the practical range.

Figure 10:
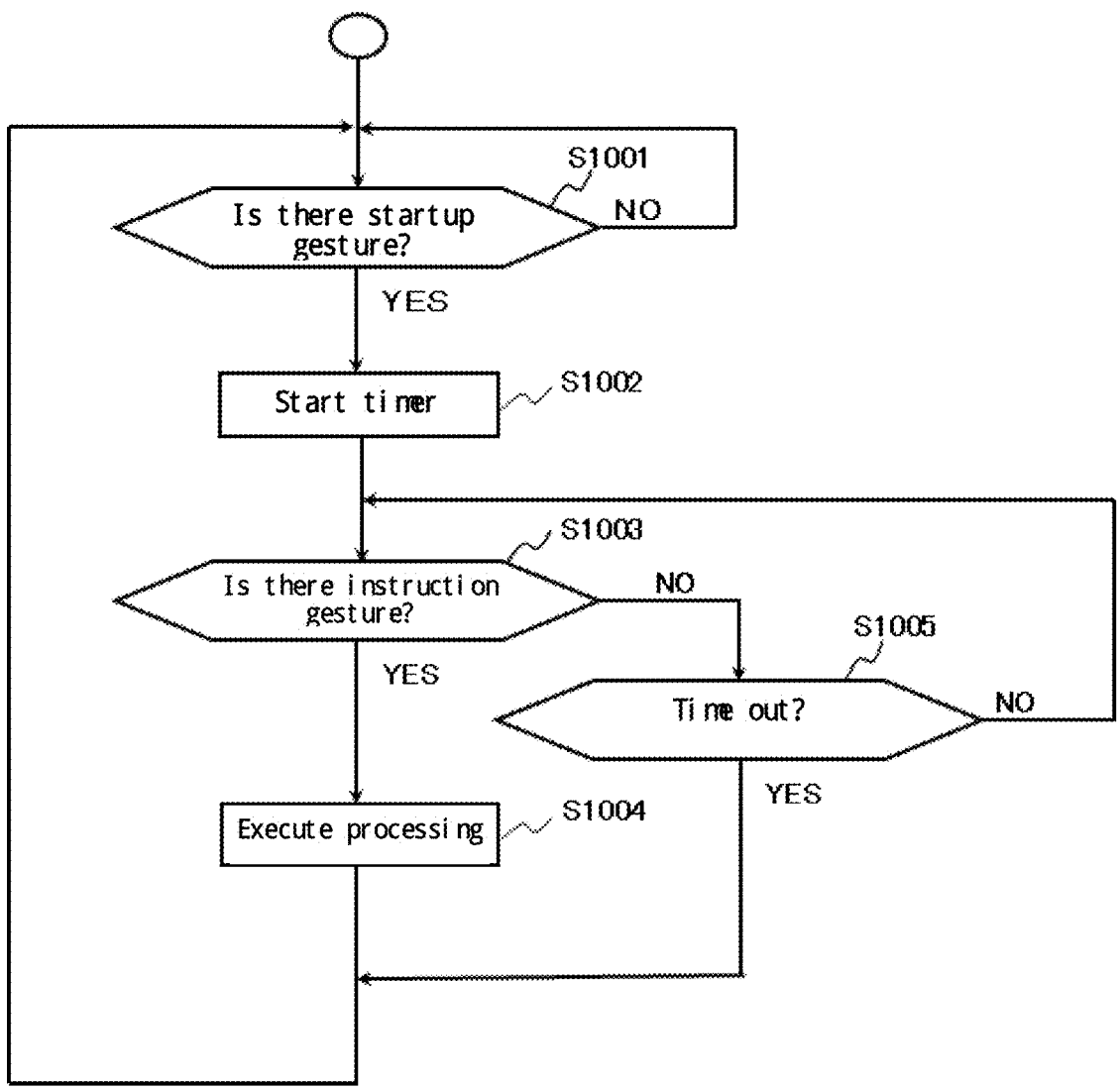
FIG. 10 is a flowchart showing a detailed example of gesture processing.

Also, in this embodiment, the user 203 can operate the image display system 100 using gestures. FIG. 10 is a flowchart of gesture operation processing of the image display system according to this embodiment.

The viewpoint position calculation unit 101 monitors whether a predetermined startup gesture is performed based on the user space images that are updated chronologically (step S1001). The startup gesture is a preliminary gesture for instructing the image display system 100. Although the specific gesture is not particularly limited, for example, it is a gesture of placing a hand on the head. While no startup gesture is detected, even if an instruction gesture instructing predetermined processing is performed, the image display system 100 does not execute the processing.

Upon detecting the startup gesture, the viewpoint position calculation unit 101 then starts up the timer (step S1002). This timer is a timer that measures the time during which an instruction gesture is enabled by the startup gesture. When the startup gesture is detected, the viewpoint position calculation unit 101 may present to the user 203 that the startup gesture has been detected, by performing a predetermined instruction acceptance display on the screen 201 of the display 104. Also, the viewpoint position calculation unit 101 may continue to display the instruction acceptance display on the display 104 until the startup gesture is detected or the timer times out.

Next, the viewpoint position calculation unit 101 monitors whether the instruction gesture is performed based on the user space images that are updated chronologically (step S1003). The instruction gesture is a gesture for instructing predetermined processing as described above. There may be multiple types of processing that can be instructed through gestures. In this case, a different instruction gesture may be determined for each processing.

While no instruction gesture is detected (the result of the determination in step S1003 is NO), the viewpoint position calculation unit 101 monitors whether or not the timer has timed out, and monitors the instruction gesture until the timer times out (the result of the determination in step S1005 is repeatedly NO).

If the timer times out before the instruction gesture is detected (YES in step S1005), the viewpoint position calculation unit 101 returns to the processing of step S1001 and monitors the startup gesture.

If the instruction gesture is detected before the timer times out (YES in step S1003), the viewpoint position calculation unit 101 executes processing corresponding to the instruction gesture (step S1004). Thereafter, the viewpoint position calculation unit 101 returns to the processing of step S1001.

As described above, upon detecting a predetermined instruction gesture after detecting a predetermined startup gesture from chronological user space images, the viewpoint position calculation unit 101 executes predetermined processing corresponding to the instruction gesture. Since the processing is executed when there is a two-step gesture, it is possible to prevent processing that is not intended by the user 203 from being erroneously executed.

Note that although this embodiment shows an example in which a two-step gesture is adopted, the present invention is not limited to this. As another example, the image display system 100 may also be operated using a one-step gesture. In this case as well, erroneous operation can be suppressed by using gestures that are rarely performed with normal operations. Also, if a predetermined instruction gesture is detected after two or more previous gestures have been detected, processing corresponding to the instruction gesture may be executed.

Also, although the present embodiment shows an example in which the image display system 100 includes one display 104, the present invention is not limited to this. As another example, the image display system 100 may also include multiple displays 104. In this case, for example, the storage unit 105 holds screen arrangement data indicating the position, orientation, and shape of each screen 201 of the plurality of displays 104 in the reference coordinate space. Also, the viewpoint position calculation unit 101 generates a display image of a three-dimensional object for each of the plurality of displays 104 based on the screen arrangement data of the screens 201 (screen position data 601 and screen orientation data 602) and the three-dimensional data 606, and displays each display image on the screens 201 of the displays 104. Calculations are performed by arranging the positions and orientations of the screens 201 of all of the displays 104 in the same reference coordinate space, and therefore the images displayed on all of the displays 104 can be calculated using the same calculation method regardless of what kinds of positions and orientations the multiple displays 104 are installed in. Also, since calculation is performed by arranging the positions and orientations of the screens 201 of all of the displays 104 in the same reference coordinate space, the images of the plurality of displays 104 can be aligned with high precision and made continuous with each other. This exhibits a high visual effect in improving the interior scenery of hotels, residences, offices, and the like, for example.

Also, the image display system 100 according to this embodiment may include various additional functions.

For example, the image display system 100 may include a communication device that connects to a communication network such as the Internet. The image display system 100 may transmit information to or receive information from a Web server via the communication device. The operation of transmitting or receiving information may be performed using the above-mentioned gestures.

Also, the image display system 100 may be connected to a personal computer and can be used as a monitor that displays an image of the personal computer (PC). The connection interface unit is, for example, HDMI (High-Definition Multimedia Interface) (HDMI is a registered trademark of HMI Licensing Administrators, Inc.) or VGA (Video Graphics Array). Operations such as mode switching between the simulated window and the PC monitor may be performed using the above-mentioned gestures.

Figure 11:
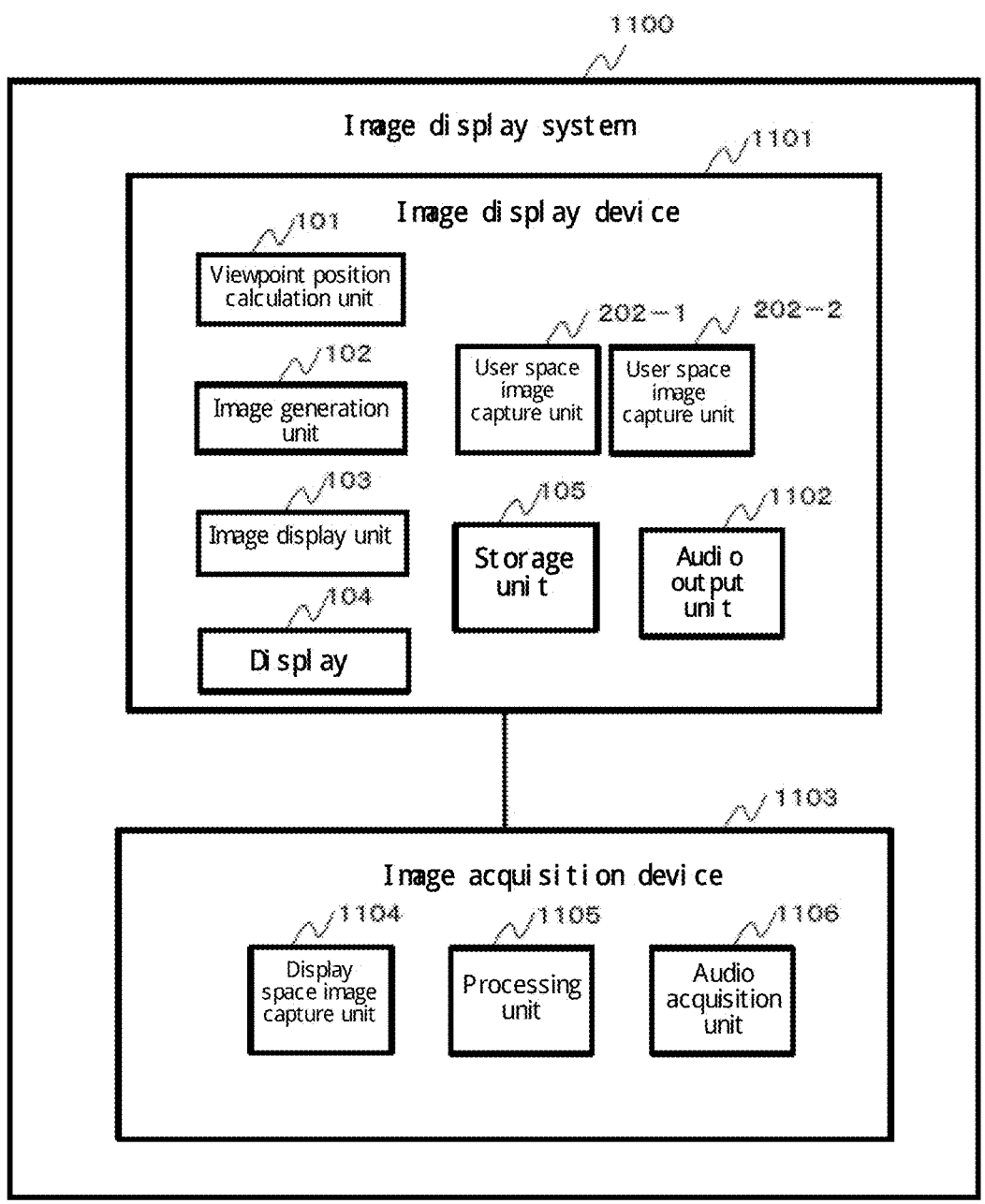
FIG. 11 is a diagram showing an example of a configuration according to another embodiment.

In this embodiment, the image display system 100 that displays an image of a virtual three-dimensional object was illustrated, but the present invention is not limited to this. As another example, it is also possible to display an image of real space on the display 104. FIG. 11 illustrates an image display system that displays an image of real space.

FIG. 11 is a block diagram of an image display system according to another embodiment. Referring to FIG. 11, an image display system 1100 includes an image display device 1101 and an image acquisition device 1103. The image display device 1101 and the image acquisition device 1103 are connected to each other via a communication line. For example, the image display device 1101 may be one in which the image acquisition device 1103 acquires three-dimensional data based on a photographed image via a communication network and displays the acquired three-dimensional image. Also, the image display device 1101 and the image acquisition device 1103 may be connected to each other through wired or wireless communication, and the image display device 1101 may display, in real time, an image based on the image acquired by the image acquisition device 1103. The image display device 1101 is the same as the image display system 100 shown in one embodiment, and includes a viewpoint position calculation unit 101, an image generation unit 102, an image display unit 103, a display 104, two user space image capture units 202-1 and 202-2, and a storage unit 105. In addition to these, the image display device 1101 also has an audio output unit 1102. The image acquisition device 1103 includes a display space image capture unit 1104, a processing unit 1105, and an audio acquisition unit 1106.

The display space image capture unit 1104 acquires an image of a display space, which is real space, to be displayed on the display 104.

The audio acquisition unit 1106 acquires audio in the display space.

The processing unit 1105 generates three-dimensional data using the data of the image acquired by the display space image capture unit 1104. Then, the processing unit 1105 transmits the generated three-dimensional data and the audio data acquired by the audio acquisition unit 1106 to the image display device 1101.

There is no particular limitation on the method by which the processing unit 1105 generates three-dimensional data from the photographed image acquired by the display space image capture unit 1104. For example, the obtained planar photographed image may be used as-is, or may be divided into a plurality of images of a predetermined size, and the images may be arranged planarly in a three-dimensional space. The display space image capture unit 1104 uses a camera that uses a wide-angle lens with a field of view of 180° or close to it, a 360° camera, or the like, and is installed in a three-dimensional space, in a form obtained by attaching an image imaged by the display space image capture unit 1104 to an inner surface of a spherical object in a three-dimensional space. Also, a camera using light field technology in the display space image capture unit 1104 acquires information on the incident direction and intensity of light, and uses that information to perform image processing to obtain data obtained by imaging the three-dimensional space including depth information. This data may be arranged in three-dimensional space. Also, a photographed image may be made three-dimensional and arranged in a three-dimensional space. A plurality of stereo cameras may capture photographed images having depth information, and three-dimensional data may be created based on the photographed images and the depth information. In this case, the display space image capture unit 1104 is a collection of a plurality of single image capture units, and acquires images of the display space from a plurality of directions.

As described above, in this embodiment, in the image acquisition device 1103, the display space image capture unit 1104 acquires an image by capturing an image of a display space, which is a real space in which display is to be performed. The processing unit 1105 generates three-dimensional data using the data of the image acquired by the display space image capture unit 1104. Then, using this three-dimensional data, the image display device 1101 displays, on the display, an image of the three-dimensional space represented by the three-dimensional data viewed from the position of the user 203 through the screen 201. Accordingly, an image of real space can be displayed on the display 104 as an image visible from the user viewpoint position.

Also, in this embodiment, the audio acquisition unit 1106 acquires audio in the display space. Then, the audio output unit 1102 outputs the audio to the user space. Accordingly, not only images of the display space but also audio can be reproduced, and therefore the user 203 can visually and aurally sense the real space behind the simulated window on the display 104.

Although there is no particular limitation on the method for using the image display system 1100 according to the present embodiment, use thereof in which the image acquisition device 1103 is arranged in a stadium or the like and the field of view from an audience seat for viewing an actual sports game is reproduced virtually on the image display device 1101, use thereof in which the image display system 1100 is connected to via a communication network, and real-time communication using images and audio is performed between remote locations by mutually transmitting and receiving images and audio acquired by the image acquisition device 1103, and the like are envisioned.

Figure 12:
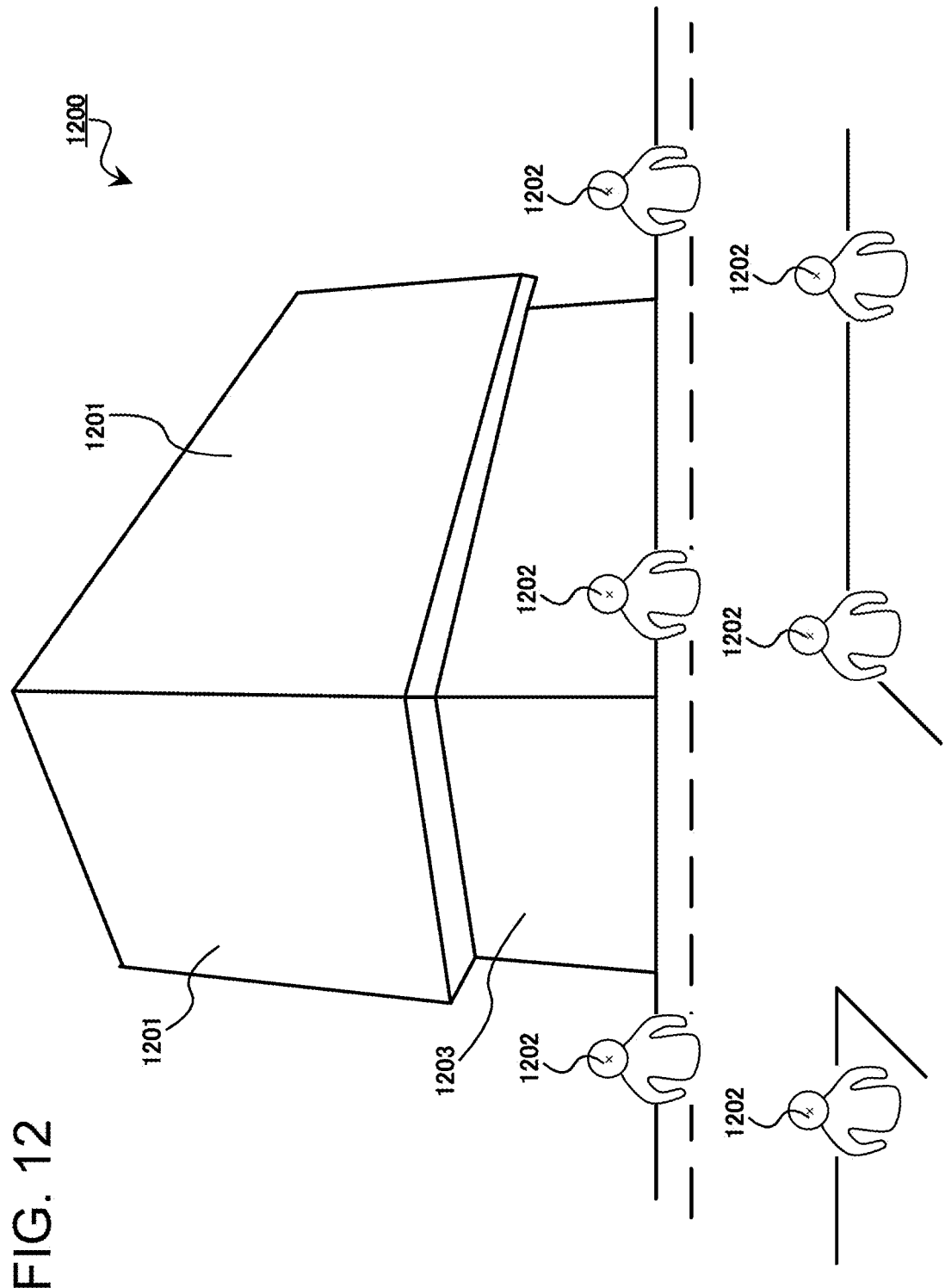
FIG. 12 is a diagram showing an example of a configuration according to yet another embodiment.

FIG. 12 is a diagram showing a configuration example of yet another embodiment. Another embodiment of FIG. 12 is an implementation of the present invention as a giant signage device 1200. In FIG. 12, a giant signage display 1201 that is installed on the roof of a building 1203 or the like has the same basic configuration as the display 104 described in FIGS. 1, 2, and the like, except for its size.

However, in the giant signage device 1200, users viewing the giant signage display 1201 are, for example, an unspecified number of users located around an intersection, and the user viewpoint positions are difficult to find out in real time through the same means as the user space image capture unit 202 as described in FIG. 2.

In view of this, in the embodiment shown in FIG. 12, it is assumed that virtual users 1202 are located at several locations (six locations in FIG. 12) where many users are expected to view the giant signage device 1200, and the data on the user viewpoint positions of such locations is stored in advance in a storage unit similar to the storage unit 105 in FIG. 1 in the same manner as the user viewpoint position data 607 in FIG. 6.

Then, using the user viewpoint position data 607 stored in this manner, control processing similar to the processing of steps S702 and S703 in FIG. 7 and the processing of FIG. 9 according to an embodiment is executed.

Although this cannot provide display pixels corresponding to the users in this case as accurately as in the embodiment described in FIGS. 1 to 9, the use of the giant signage display 1201 can make it possible to simultaneously display a sufficiently realistic display to people present at a plurality of locations.

In the other embodiment shown in FIG. 12, processing is performed by virtually determining the user viewpoint positions in advance, but the same device as the user space image capture unit 202 of FIG. 2, which is installed on a building roof, can be used, and image capture can be used to identify where clusters of user groups are concentrated, information corresponding to the user viewpoint positions can be acquired from the identification result, and the same processing as in the embodiment described in FIGS. 1 to 9 can also be executed.

In the above-described embodiment and other embodiments, an example was described in which the display 104 has the screen 201 that can simultaneously display different images in a plurality of display directions, as described in FIG. 4, the element images 401 are constituted by a plurality of pixels, and a lens element 402 such as a lenticular lens is used for each element image 401, but the present invention is not limited to this. In addition to a lenticular lens, the lens attached to the surface may be a spherical lens that controls the direction of light, or a large lens or sheet that matches the size of a large LED array. For example, instead of the lens elements 402, a parallax barrier or the like in which a plurality of slits are arranged may be used. Although there is no particular limitation on the display method of the display, the display may be a liquid crystal display, a plasma display, an organic EL display, a field emission display (FED), a mini LED display, a micro LED display, or a large LED array. The display may be a sheet on which images are projected from the back using a rear projection method. Also, the method for displaying images in a plurality of display directions is not limited to the lens array method, and may be one in which a plurality of displays are stacked. A tensor display may also be used.

REFERENCE SIGNS LIST

100 Image display system
101 Viewpoint position detection unit
102 Image generation unit
103 Image display unit
104 Display
105 Storage unit
201 Screen
202, 202-1, 202-2 User space image capture unit
203 User
204 User viewpoint position
205 Position
206 Position
301, 301A, 301B, 301C Field of view
302, 302A, 302B, 302C Display
401 Element image
402 Lens element
403 Line-of-sight direction
501 Display direction
502 User viewpoint position direction
503 Midpoint direction
601 Screen position data
602 Screen orientation data
603 Screen shape data
604 Image capture position data
605 Image capture orientation data
606 Three-dimensional data
607 User viewpoint position data
608 Display image data
1100 Image display system
1101 Image display device
1102 Audio output unit
1103 Image acquisition device
1104 Display space image capture unit
1105 Processing unit
1106 Audio acquisition unit
1200 Giant signage device
1201 Giant signage display
1202 Virtual user
1203 Building

The invention claimed is:

1. An image display system comprising:
  a display including a screen capable of simultaneously displaying different images in a plurality of display directions;
  a storage unit configured to store screen arrangement data indicating a position, orientation, and shape of the screen in a predetermined reference coordinate space set virtually, three-dimensional data representing a three-dimensional object in the reference coordinate space, and user viewpoint position data three-dimensionally indicating one or more user viewpoint positions in the reference coordinate space;

an image generation unit configured to generate, for each of the one or more user viewpoint positions, a display image, which is a two-dimensional image obtained by projecting the three-dimensional object on the screen and in which a three-dimensional object appears in the same manner as when the three-dimensional object arranged in the reference coordinate space is being viewed through the screen from the user viewpoint position located at a distance in a depth direction from the screen and a position on a plane orthogonal to the depth direction according to the user viewpoint position data in the reference coordinate space when displayed on the screen, the display image being generated based on the user viewpoint position data, the image arrangement data, and the three-dimensional data; and an image display unit configured to cause the display to display, for each of the one or more user viewpoint positions, the display image generated so as to correspond to the user viewpoint position, the display images being displayed in user viewpoint position directions that correspond to the user viewpoint positions.

2. The image display system according to claim 1, wherein the image generation unit generates the display image for each of the user viewpoint positions by applying projective transformation of each of the user viewpoint positions to the three-dimensional data.

3. The image display system according to claim 1, wherein the image generation unit generates, for each of the one or more user viewpoint positions, the display image, by projecting each of points of the three-dimensional data onto a point at which a straight line connecting the point of the three-dimensional data and the user viewpoint position intersects the screen, in the reference coordinate space.

4. The image display system according to claim 1, further comprising
a user space imaging unit configured to capture an image of a user space in which a user viewing an image displayed on the screen of the display can be present, and acquire a user space image,
wherein the storage unit further stores image capture unit arrangement data indicating a position and an orientation of the user space image capture unit in the reference coordinate space, and
based on the image capture unit arrangement data and the user space image acquired by the user space image capture unit, the image generation unit specifies one or more user viewpoint positions in the reference coordinate space.

5. The image display system according to claim 4, wherein the image generation unit generates, for each of the detected user viewpoint positions, a right-eye display image and a left-eye display image, which are two-dimensional images obtained by projecting the three-dimensional object onto the screen, respectively from a right eye and a left eye of the user at the user viewpoint position, and in which the three-dimensional object appears in the same manner as when the three-dimensional object arranged in the reference coordinate space is being viewed through the screen from positions of the right eye and the left eye in the reference coordinate space when displayed on the screen, and
the image display unit causes the display to display the right-eye display image in a direction of the right eye of the user, and causes the display to display the left-eye display image in a direction of the left eye of the user.

6. The image display system according to claim 1, wherein the image display unit causes the display to display, in a non-user viewpoint position direction that is not the user viewpoint position direction, a display image generated based on a display image generated so as to correspond to the user viewpoint position near the non-user viewpoint position direction.

7. The image display system according to claim 1, further comprising
a plurality of the displays,
wherein the storage unit stores screen arrangement data indicating a position, orientation, and shape of each of screens of the plurality of displays in the reference coordinate space, and
the image generation unit generates, for each of the plurality of displays, a display image of the three-dimensional object based on the screen arrangement data of the display and the three-dimensional data, and displays the display image on the image display unit.

8. The image display system according to claim 4, wherein the image generation unit calculates a plurality of coordinates of positions corresponding to a user viewpoint position based on images captured by a plurality of the user space image capture units that are different or a plurality of different combinations of the user space image capture units, and calculates the user viewpoint position based on the coordinates of the plurality of positions.

9. The image display system according to claim 4, wherein the image generation unit records the user viewpoint position in the storage unit, and when a current user viewpoint position cannot be specified from the user space image captured by the user space image capture unit, the image generation unit estimates the current user viewpoint position based on the chronological user viewpoint positions recorded in the storage unit.

10. The image display system according to claim 4, wherein the image generation unit detects a predetermined gesture performed by a user from the chronological user space images and executes predetermined processing corresponding to the gesture.

11. The image display system according to claim 10, wherein upon detecting a predetermined instruction gesture after detecting a startup gesture from the chronological user space images, the image generation unit executes predetermined processing corresponding to the instruction gesture, and does not execute the processing if the instruction gesture is detected without detecting the startup gesture.

12. The image display system according to claim 1, further comprising
a display space image capture unit configured to acquire an image by capturing an image of a display space, which is a real space in which display is to be performed,
wherein the image generation unit generates the three-dimensional data by using data of the image acquired by the display space image capture unit.

13. The image display system according to claim 1, further comprising:
an audio acquisition unit configured to acquire audio in the display space; and an audio output unit configured to output the audio to the user space.

14. The image display system according to claim 1, wherein the one or more user viewpoint positions in the reference coordinate space are one or more positions defined in advance in the reference coordinate space.

15. The image display system according to claim 14, wherein the one or more user viewpoint positions defined in advance in the reference coordinate space are defined according to positions at which users are likely to stay in the user space.

16. The image display system according to claim 14, wherein the one or more user viewpoint positions defined in advance in the reference coordinate space are defined according to positions at which it is not desired that users stay in the user space.

17. An image display method for executing:

image generation processing for generating, for each of one or more user viewpoint positions in a predetermined reference coordinate space set virtually, a display image based on user viewpoint position data three-dimensionally indicating the user viewpoint position in the reference coordinate space, image arrangement data indicating a position, orientation, and shape of a screen in the reference coordinate space on a display including the screen that can simultaneously display different images in a plurality of display directions, and three-dimensional data representing a three-dimensional object in the reference coordinate space, the display image being a two-dimensional image obtained by projecting the three-dimensional object onto the screen, and the three-dimensional object in the display image appearing in the same manner as when the three-dimensional object arranged in the reference coordinate space is being viewed through the screen from the user viewpoint position; and image display processing for causing the display to display, for each of the one or more user viewpoint positions, the display image generated so as to correspond to the user viewpoint position, the display images being displayed in user viewpoint position directions toward the user viewpoint positions.

* * * * *